(12) United States Patent
Barrus et al.

(10) Patent No.: US 6,693,652 B1
(45) Date of Patent: Feb. 17, 2004

(54) SYSTEM AND METHOD FOR AUTOMATIC GENERATION OF VISUAL REPRESENTATIONS AND LINKS IN A HIERARCHICAL MESSAGING SYSTEM

(75) Inventors: John W. Barrus, Menlo Park, CA (US); Gregory J. Wolff, Redwood City, CA (US)

(73) Assignee: Ricoh Company, Ltd., Tokyo (JP)

( * ) Notice: Subject to any disclaimer, the term of this patent is extended or adjusted under 35 U.S.C. 154(b) by 430 days.

(21) Appl. No.: 09/671,505

(22) Filed: Sep. 26, 2000

Related U.S. Application Data

(63) Continuation-in-part of application No. 09/407,010, filed on Sep. 28, 1999.

(51) Int. Cl.[7] .................................................. G06F 3/00
(52) U.S. Cl. ...................... 345/838; 345/748; 345/835; 345/769
(58) Field of Search ................................. 345/748, 764, 345/769, 760, 810, 835, 838

(56) References Cited

U.S. PATENT DOCUMENTS 5,745,112 A * 4/1998 Hirose ........................ 345/769
5,751,286 A * 5/1998 Barber et al. ............... 345/835
6,091,408 A * 7/2000 Treibitz et al. .............. 345/753

* cited by examiner

*Primary Examiner*—John Cabeca
*Assistant Examiner*—Kieu D. Vu
(74) *Attorney, Agent, or Firm*—Fenwick & West LLP

(57) ABSTRACT

A multimedia message system automatically generates visual representations (thumbnails) of message or media objects and references (links) between media objects; nests messages within themselves; and automatically updates generated thumbnails. An object, including a thumbnail image of the object's contents and a link to the original content, is created in response to simple user inputs or commands. An image of the object is generated whether the object be a web page, a multimedia message, a hypertext link, a video clip, or a document. A link or reference to the original object from which the image was formed is also generated. The system retrieves and displays information referenced by an object and shown by the thumbnail image corresponding to the object. The system also automatically updates the thumbnail image(s) representing an object any-time the underlying object or information from which the image was generated has been modified.

19 Claims, 21 Drawing Sheets

General method for automatic creation

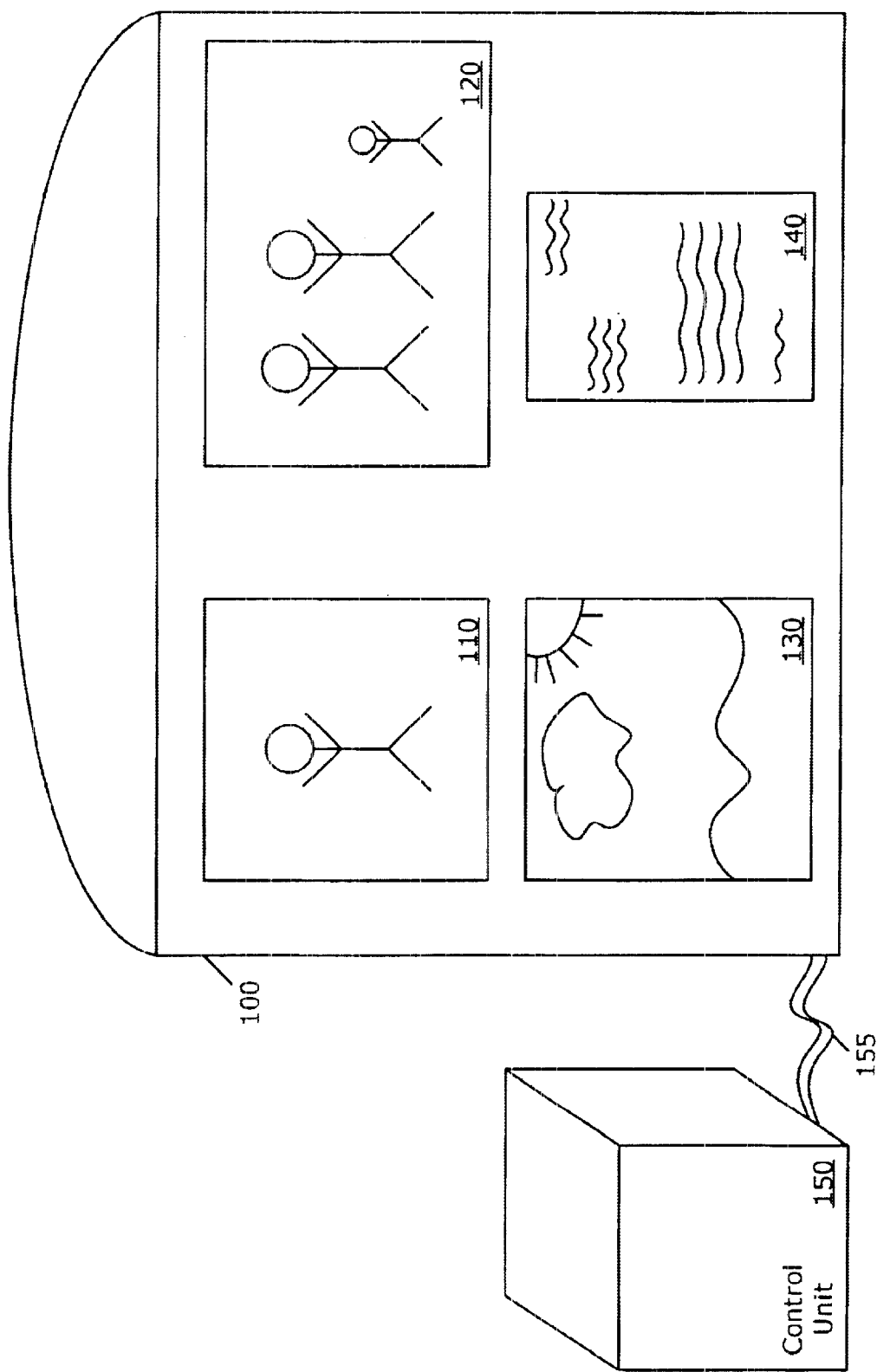

```
<CHRONICLE SAVETIME= "927336993806" AUTHORID="marko"/>
<SUBCHRONICLE AUTHORID="marko" STARTTIME="927336940440">
<CLIP><AUDIOREFS LENGTH="3240">
<AUDIO SRC="http://Server/Clip1.au"/>
<CLIPREF TIME="1753" REF="http://Server/Doc1"/>
</AUDIOREFS></CLIP>
<CLIP><AUDIOREFS LENGTH="11600">
<AUDIO SRC= "http://Server/Clip2.au"/>
<CLIPREF TIME= "2293" POINTX= "250" POINTY= "750" REF= "http://Server/Doc2"/>
<CLIPREF TIME= "6259" POINTX= "330" POINTY= "250" REF= "http://Server/Doc3"/>
</AUDIOREFS></CLIP>
<CLIP><AUDIOREFS LENGTH= "1920">
<AUDIO SRC= "http://Server/Clip3.au"/>
</AUDIOREFS></CLIP>
</SUBCHRONICLE>
<SUBCHRONICLE AUTHORID="marko" STARTTIME= "927336977200">
<CLIP><AUDIOREFS LENGTH= "6560">
<AUDIO SRC= "http://Server/Clip4.au"/>
<CLIPREF TIME= "4086" REF= "http://Server/Doc4"/>
</AUDIOREFS></CLIP>
</SUBCHRONICLE>
</CHRONICLE>
```

FIG. 3b

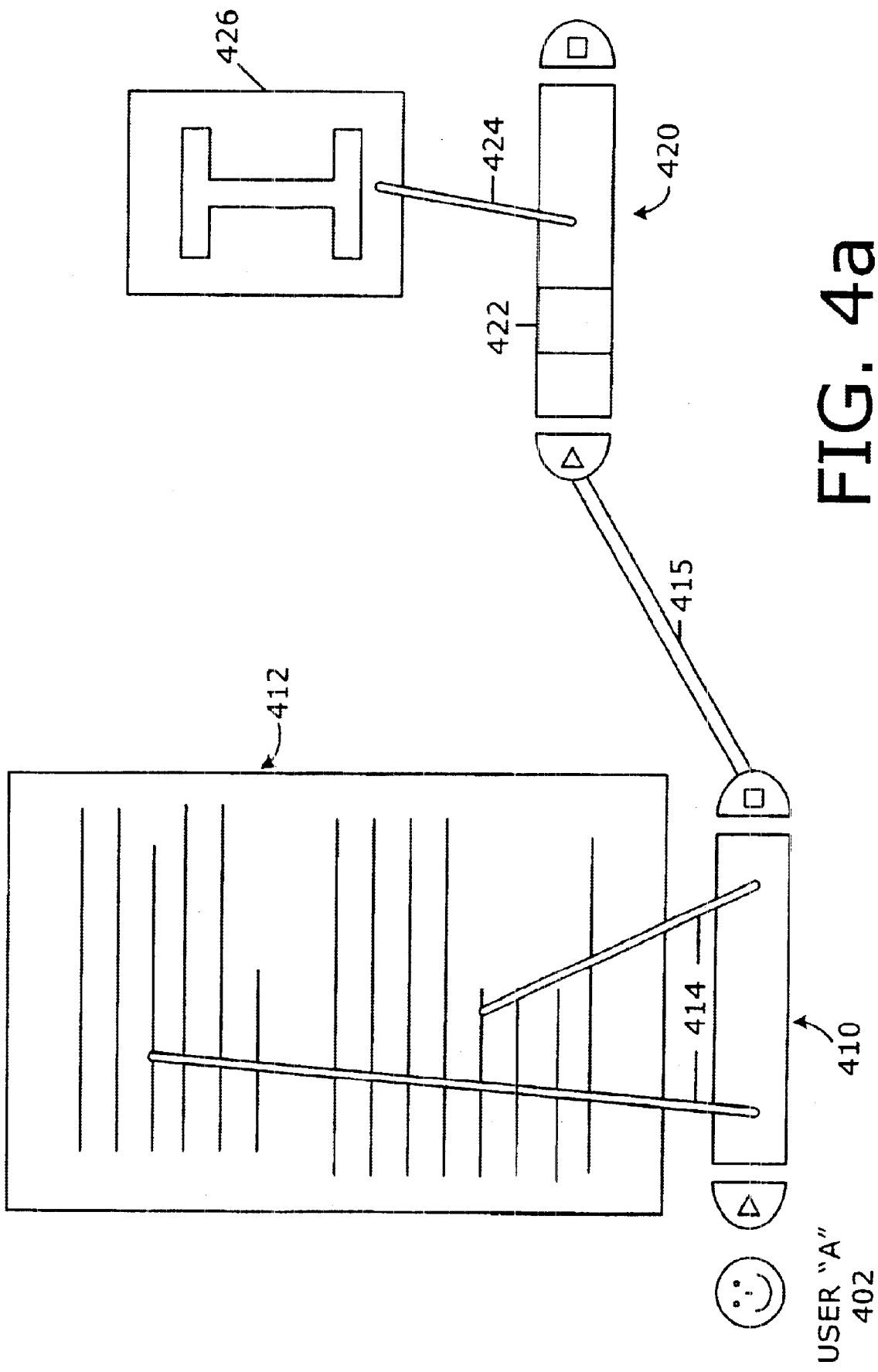

General method for automatic creation

General method for automatic creation from a web page

General method for automatic creation from a multimedia message

General method for automatic creation from a hypertext link

General method for viewing messages

General method for automatic updating of Thumbnail image

SYSTEM AND METHOD FOR AUTOMATIC GENERATION OF VISUAL REPRESENTATIONS AND LINKS IN A HIERARCHICAL MESSAGING SYSTEM

CROSS-REFERENCES TO RELATED APPLICATIONS

The present application is a continuation-in-part of U.S. patent application Ser. No. 09/407,010, entitled "Method and Apparatus for Generating Visual Representations for Audio Documents," filed on Sep. 28, 1999, which is incorporated herein. The present invention also relates to U.S. patent application Ser. No. 09/540,042, entitled "Systems And Methods For Providing Rich Multimedia Messages To Remote Users Using Telephones And Facsimile Machines," filed on Mar. 31, 2000, which is incorporated herein by reference. The present invention also relates to U.S. patent application Ser. No. 09/587,591, entitled "Method and System for Electronic Message Composition with Relevant Documents" filed on May 31, 2000, which is incorporated herein by reference. The present invention also relates to U.S. patent application Ser. No. 10/043,443, entitled "System and Method for Audio Creation and Editing in a Multimedia Messaging Environment."

BACKGROUND OF THE INVENTION

1. Field of the Invention

The present invention relates to systems and methods for authoring or generating, storing and retrieving multimedia messages that may include audio, text documents, images, web pages (URLs) and video. In particular, the present invention relates to a system and method for automatically generating images and links in a multimedia message system. The present invention also relates to a hierarchical message system providing nesting of messages within each other.

2. Description of the Background Art

A large percentage of a typical person's day is spent communicating with others through various mechanisms including oral and written media. Further, there is often a tradeoff between rich, oral communication media and less rich, written communication media. While oral media enable negotiation, clarification, explanation and exchange of subjective views, written media enable the exchange of large amounts of accurate, objective or numeric data.

This dichotomous relationship between oral and written communication similarly exists within the electronic realm. Simple textual email messages, although easy to author, typically do not allow rich, expressive communication as may sometimes be required. On the other hand, tools for creating richer, more expressive messages, such as multimedia presentation software, are too complex and time-consuming for casual or day-to-day use. Furthermore, multimedia presentation software typically is not designed for use as a bi-directional communication or conversation tool. Multimedia "documents" produced using this software tend to present information to an audience, rather than allow user interaction and self-guided learning.

Existing messaging systems employ a single primary media. E-mail uses text, while voicemail uses recorded audio for conveying the message. Some systems allow other media objects to be "attached" to a message, but do not support explicit reference from the message content to the attached objects or particular pieces of the attached objects. Such references are needed in order to allow the sender of the message to, for example, refer to a particular paragraph in a printed document or a face in a photographic image.

A mechanism for specifying these references and a visual representation of the references and indicated media objects is required. Furthermore, a user may wish to refer to/include one or more previous messages in a new message. An efficient means for creating and viewing such hierarchical messages is therefore needed.

Therefore, what is needed is a method for creating a simple and effective multimedia-authoring tool that overcomes the limitations found within the prior art.

SUMMARY OF THE INVENTION

The present invention overcomes the deficiencies and limitations of the prior art by providing a system and method for creating, sending and receiving multimedia messages. The multimedia message system includes modules for the automatic generation of visual representations of the media objects and references to them such as thumbnail images and links. The multimedia message system also includes modules for the hierarchical nesting of message within themselves, and automatic updating of generated thumbnails. In one embodiment, the system includes an automatic message creation module, an image generation module, a link generation module, a hierarchical object display module and a dynamic updating module. These modules are coupled by a bus for communication with a processor of the multimedia message system and integrated as a part of the multimedia message system. The automatic message creation module controls other modules such that an object including a thumbnail image of the object's contents and a link to the original content are created in response to simple user inputs or commands. The image generation module and the link generation module operate in response to the automatic message creation module to generate an image of the object whether it be a web page, a multimedia message, a hypertext link, a video clip, or a document; or to generate a link or reference to the original object from which the image was formed, respectively. The hierarchical object display module allows the system to retrieve and display information referenced by an object and shown by the thumbnail image corresponding to the object. The system also includes the dynamic updating module that automatically updates the thumbnail image(s) representing an object any time the underlying object or information from which the image was generated has been modified.

The present invention also includes a number of novel methods including: a method for automatically creating thumbnail images of objects; a method for specifying a reference from recorded audio to a media object or component; a method for automatically creating an object including an image of a web page; a method for automatically creating an object including an image of an existing multimedia message; a method for automatically creating an object including an image from a hypertext link; a method for viewing information for an object; and a method for automatically updating images of an object after a change to an existing multimedia message.

BRIEF DESCRIPTION OF THE DRAWINGS

The invention is illustrated by way of example, and not by way of limitation in the figures of the accompanying drawings in which like reference numerals refer to similar elements.

FIG. 1A illustrates portions of an electronic display system upon which electronic documents are shown.

FIG. 3B illustrates one embodiment of an XML representation for the multimedia message shown in FIG. 3A.

FIG. 4A illustrates another embodiment of a multimedia message.

DETAILED DESCRIPTION OF THE PREFERRED EMBODIMENTS

Figure 1B:
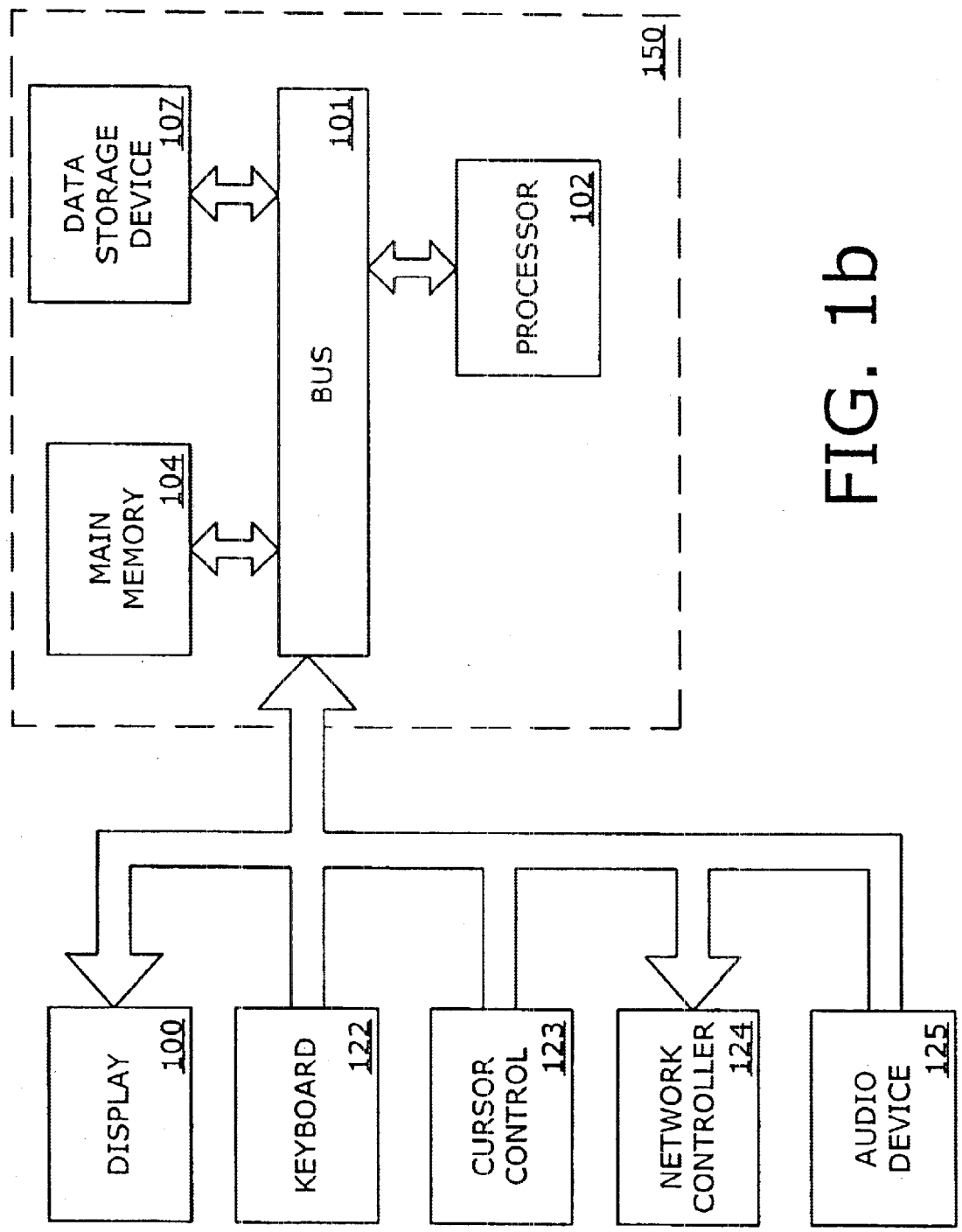
FIG. 1B is a block diagram illustrating one embodiment of the electronic display system of FIG. 1A in detail.

A method and apparatus for generating visual representations for multimedia documents is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Moreover, the present invention is claimed below operating on or working in conjunction with an information system. Such an information system as claimed may be the entire messaging system as detailed below in the preferred embodiment or only portions of such a system. For example, the present invention can operate with an information system that need only be a browser in the simplest sense to present and display media objects. The information system might alternately be the messaging system described below with reference to FIG. 8. Thus, the present invention is capable of operating with any information system from those with minimal functionality to those providing all the functionality disclosed herein.

FIG. 1A illustrates portions of an electronic display system upon which various electronic documents are displayed. FIG. 1A shows only portions of the electronic display system which is more fully detailed below with reference to FIG. 11B. Referring to FIG. 1A, display device 100 may comprise any device equipped to display electronic images and data as described herein. Display device 100 may be, for example, a cathode ray tube (CRT), liquid crystal display (LCD), or any other similarly equipped display device, screen, or monitor. In one embodiment, display device 100 is equipped with a touch screen in which a touch-sensitive, transparent panel covers the screen of display device 100. Additionally, display device 100 is shown coupled to control unit 150 by connector cable 155. Connector cable 155 may be external or internal to display device 100.

Control unit 150 may comprise an arithmetic logic unit, a microprocessor, a general purpose computer, a personal digital assistant or some other information appliance equipped to provide electronic display signals to display device 100. In one embodiment, control unit 150 comprises a general purpose computer having a graphical user interface, which may be generated by, for example, a program written in Java running on top of an operating system like WINDOWS® or UNIX® based operating systems. In one embodiment, electronic documents 110, 120, 130, and 140 are generated by one or more application programs executed by control unit 150 including, without limitation, word processing applications, electronic mail applications, spreadsheet applications, and web browser applications. In one embodiment, the operating system and/or one or more application programs executed by control unit 150 provide "drag-and-drop" functionality where each electronic document, such as electronic documents 110, 120, 130, and 140, may be encapsulated as a separate data object.

Referring still to FIG. 1A, connector cable 155 represents any connector cable known in the art to route display signals from a device such as control unit 150 to a display device such as display device 100. In an alternative embodiment, control unit 150 may be situated within display device 100 and the use of connector cable 155 may not be required or may be internal to display device 100. The control unit 150 also has other conventional connections to other systems such as a network for distribution of files (media objects) using standard network protocols such as TCP/IP, HTTP, and SMTP as will be understood to those skilled in the art and shown in detail in FIG. 1B.

FIG. 1B is a block diagram of one embodiment of the electronic display system. Referring to FIG. 1B, the control unit 150 is shown including processor 102, main memory 104, and data storage device 107, all of which are communicatively coupled to system bus 101.

Processor 102 processes data signals and may comprise various computing architectures including a complex instruction set computer (CISC) architecture, a reduced instruction set computer (RISC) architecture, or an architecture implementing a combination of instruction sets. Although only a single processor is shown in FIG. 1B, multiple processors may be included.

Main memory 104 may store instructions and/or data that may be executed by processor 102. The instructions and/or data may comprise code for performing any and/or all of the techniques described herein. Main memory 104 may be a dynamic random access memory (DRAM) device, a static random access memory (SRAM) device, or some other memory device known in the art. The memory 104 is described in more detail below with reference to FIG. 8. In particular, the portions of the memory for providing automatic generation of thumbnail images, automatic updating of messages to include thumbnail images and links, and hierarchical display of messages are shown in detail.

Data storage device 107 stores data and instructions for processor 102 and may comprise one or more devices including a hard disk drive, a floppy disk drive, a CD-ROM device, a DVD-ROM device, a DVD-RAM device, a DVD-RW device, a flash memory device, or some other mass storage device known in the art.

System bus 101 represents a shared bus for communicating information and data throughout control unit 150. System bus 101 may represent one or more buses including an industry standard architecture (ISA) bus, a peripheral component interconnect (PCI) bus, a universal serial bus (USB), or some other bus known in the art to provide similar functionality.

Additional components coupled to control unit 150 through system bus 101 include display device 100, keyboard 122, cursor control device 123, network controller 124 and audio device 125. Display device 100 represents any device equipped to display electronic images and data as described herein. Display device 100 may be a cathode ray tube (CRT), liquid crystal display (LCD), or any other similarly equipped display device, screen, or monitor. Keyboard 122 represents an alphanumeric input device coupled to control unit 150 to communicate information and command selections to processor 102. Cursor control 123 represents a user input device equipped to communicate positional data as well as command selections to processor 102. Cursor control 123 may include a mouse, a trackball, a stylus, a pen, a touch screen, cursor direction keys, or other mechanisms to cause movement of a cursor. Network controller 124 links control unit 150 to a network that may include multiple processing systems. The network of processing systems may comprise a local area network (LAN), a wide area network (WAN) (e.g., the Internet), and/or any other interconnected data path across which multiple devices may communicate.

One or more I/O devices 125 are coupled to the system bus 101. For example, the I/O device 125 may be an audio device 125 equipped to receive audio input and transmit audio output. Audio input may be received through various devices including a microphone within audio device 125 and network controller 124. Similarly, audio output may originate from various devices including processor 102 and network controller 124. In one embodiment, audio device 125 is a general purpose, audio add-in/expansion card designed for use within a general purpose computer system. Optionally, audio device 125 may contain one or more analog-to-digital or digital-to-analog converters, and/or one or more digital signal processors to facilitate audio processing.

It should be apparent to one skilled in the art that control unit 150 may include more or fewer components than those shown in FIG. 1B without departing from the spirit and scope of the present invention. For example, control unit 150 may include additional memory, such as, for example, a first or second level cache, or one or more application specific integrated circuits (ASICs). Similarly, additional components may be coupled to control unit 150 including, for example, image scanning devices, digital still or video cameras, or other devices that may or may not be equipped to capture and/or download electronic data to control unit 150.

Audio-Narratives

In accordance with one embodiment, one can record a variable-length audio narration that may optionally describe one or more electronic documents or images displayed upon a display device. In one embodiment, by indicating a position on a display screen through clicking, pointing, or touching the display screen, audio recording is initiated and a dynamically adjustable audio gauge is displayed. In one embodiment, the audio gauge increases in size in proportion to the amount of audio recorded while the audio gauge is active. Audio recording may cease when the audio level drops below a predetermined threshold or may cease in response to specific user input. In one embodiment, for each additional positional stimulus received, a new audio gauge is generated and the previous audio gauge ceases to be adjusted, thereby becoming inactive.

The term "positional stimulus," as referred to herein, represents an input that can simultaneously indicate an electronic location on the display screen with an instant in time tracked by the control unit. Various input sources may generate a positional stimulus including, without limitation, a computer mouse, a trackball, a stylus or pen, and cursor control keys. Similarly, a touch screen is capable of both generating and detecting a positional stimulus. In one embodiment, positional stimuli are detected by control unit 150, whereas in another embodiment, positional stimuli are detected by display device 100.

In an exemplary embodiment, once a positional stimulus occurs, such as a "click" of a mouse or a "touch" on a touch screen, an audio gauge is generated on display device 100 at the location indicated by the positional stimulus. At substantially the same time as the audio gauge is generated, control unit 150, or a similarly equipped device coupled to control unit 150, begins to record audio input. In one embodiment, the size of the audio gauge displayed is dynamically adjusted to proportionally indicate the amount of audio recorded by control unit 150, or the similarly equipped device coupled to control unit 150. Audio may be recorded by control unit 150 through audio device 125 or similar audio hardware (or software), and the audio may be stored within data storage device 107 or a similarly equipped audio storage device. In one embodiment, control unit 150 initiates audio recording in response to detecting a positional stimulus, whereas in an alternative embodiment, control unit 150 automatically initiates audio recording upon detecting audio input above a predetermined threshold level. In another embodiment, a set of on-screen or physical buttons are used to control recording. Buttons for audio control are well-known and include "Record", "Play", "Stop", "Pause", "Fast Forward", and "Rewind". Similarly, audio recording may automatically be terminated upon the audio level dropping below a predetermined threshold or upon control unit 150 detecting a predetermined duration of silence where there is no audio input.

Figure 2B:
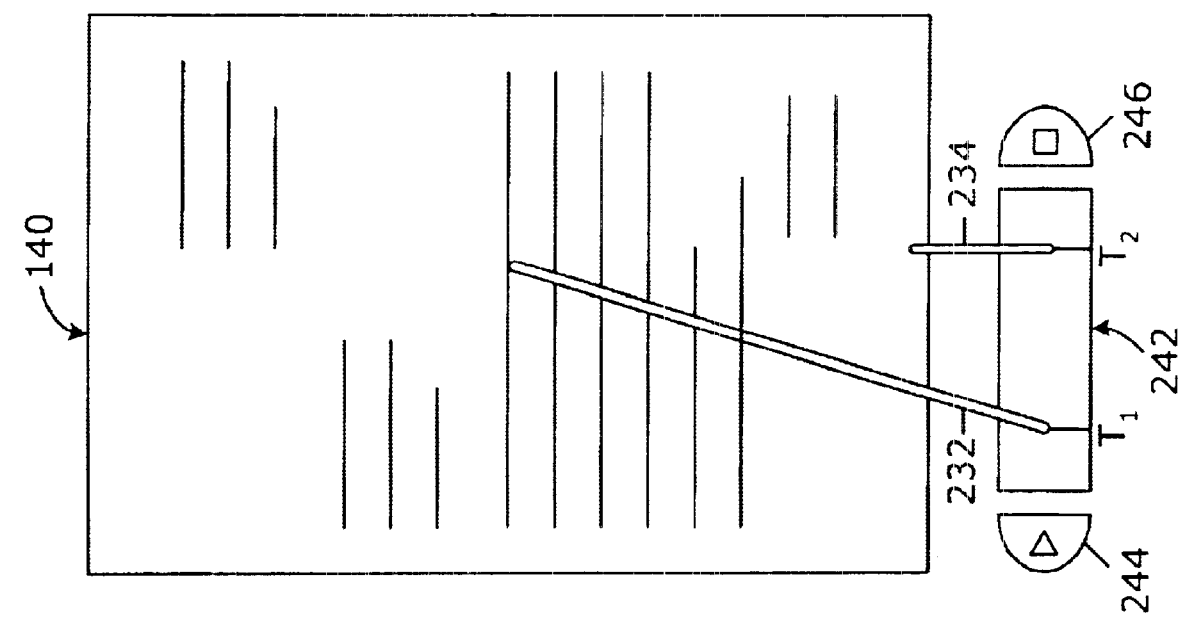
FIG. 2B illustrates one embodiment of an audio gauge or marker that includes reference markers.
Figure 2A:
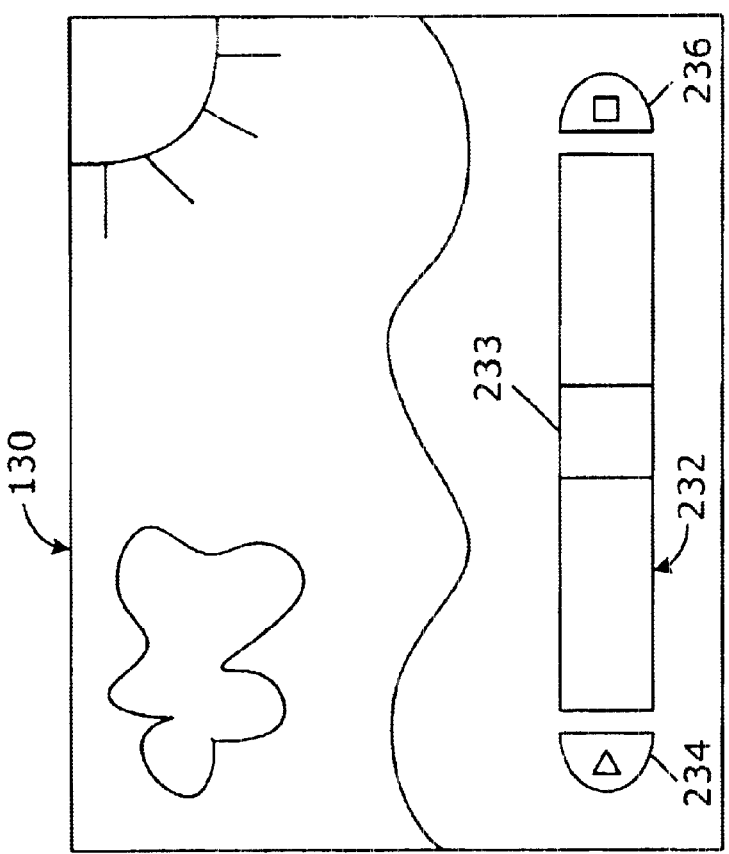
FIG. 2A illustrates an electronic document in the form of a digital photograph displayed with one embodiment of an associated audio gauge or marker.

FIG. 2A illustrates an electronic document in the form of a digital photograph displayed with an associated audio gauge. Referring to FIG. 2A, electronic document 130 is shown on display device 100. In an alternative embodiment, electronic document 130 may appear as a reduced size "thumbnail" representation of a larger image or document.

In one embodiment, audio gauge 232 is displayed overlaid upon electronic document 130 and includes start indicator 234 and stop indicator 236. Start indicator 234 marks the location at which an initial positional stimulus for audio gauge 232 was detected and stop indicator 236 marks the location at which audio gauge 232 ceased while being dynamically adjusted. In one embodiment, audio gauges cease being dynamically adjusted as a result of audio input ceasing or falling below a minimum threshold level. Since, in FIG. 2A, the positional stimulus associated with audio gauge 232 is detected at a point located on electronic document 130 (indicated by start indicator 234), audio gauge 232 is subsequently generated on electronic document 130. In one embodiment, audio gauges are rendered semi-transparently, so that electronic documents located underneath, such as electronic document 130, remain visible. Audio gauges may graphically display the recorded audio waveform or segments of speech and silence.

Audio recorded according to the methods described herein may be played back or replayed in any of a number of ways. In one embodiment, recorded audio is replayed when control unit 150 detects a positional stimulus indicating a location on, or substantially close to, the start indicator, of the associated audio gauge. In another embodiment, recorded audio is replayed when control unit 150 detects a positional stimulus indicating a location on, or substantially close to, any part of the associated audio gauge or electronic document or when the user presses a button as described above.

Audio gauges may also include a replay progress indicator such as progress puck 233. In one embodiment, as recorded audio is replayed, progress puck 233 moves along audio gauge 232 so as to indicate both the amount of recorded audio replayed as well as the amount of recorded audio remaining to be replayed. In FIG. 2A, progress puck 233 indicates that approximately 50% of the recorded audio associated with audio gauge 232 has been replayed. In other embodiments, progress indicators may take other forms including various geometric shapes or variations in color that progress along audio gauge 232. In one embodiment, replay of the recorded audio continues while a positional stimulus is detected that indicates a location on or substantially close to stop indicator 236, or until all previously recorded audio associated with the audio gauge has been replayed. Audio gauges may optionally include a "pause" indicator that, when selected, temporarily suspends recording or playback; and a "resume" indicator that resumes recording or playback after being paused.

Reference markers may also be utilized to enhance understanding of recorded audio content. FIG. 2B illustrates an exemplary audio gauge including reference markers. Referring to FIG. 2B, audio gauge 242 includes start and stop indicators 244 and 246 and is displayed upon display device 100 at a location below, electronic document 140. Note that audio gauge 242 may be overlaid on electronic document 140. Reference markers 232 and 234 graphically connect audio gauge 242 with electronic document 140. Reference markers 232 and 234 extend from time-dependent locations on audio gauge 242 to user-specified locations within electronic document 140. In one embodiment, reference markers 232 and 234 are rendered semi-transparently to allow the contents of electronic document 140 to be visible through reference markers 232 and 234.

In an exemplary embodiment, reference markers 232 and 234 are generated on display device 100 while audio is being recorded by control unit 150. Recall that according to one embodiment, audio is recorded and an audio gauge 242 generated in response to the system (either control unit 150 or display device 100) detecting a positional stimulus. As audio continues to be recorded, the size of the corresponding audio gauge 242 is proportionally adjusted so as to reflect the amount of audio recorded. In one embodiment, if the system detects an additional positional stimulus indicating a location on or substantially close to an electronic document while audio gauge 242 is being adjusted i.e., audio is being recorded), the system generates a reference marker connecting the end-point of the audio gauge 242 to that location indicated on the electronic document. In the case of audio gauge 242, reference marker 232 is initiated by a positional stimulus detected at time T1, whereas reference marker 234 is initiated by a positional stimulus detected at a later time T2. In one embodiment, during replay of the recorded audio, reference marker 232 is displayed upon display device 100 when the recorded audio reaches time T1 and reference marker 234 is displayed upon display device 100 when the recorded audio reaches time T2.

The location on an electronic document to which a reference marker is graphically connected may be represented by (x, y) coordinates in the case where an electronic document represents an image, or the location may be represented by a single coordinate in the case where an electronic document represents a linear document. Examples of linear documents may include a plain text document, a hypertext markup language (HTML) document, or some other markup language-based document including extensible markup language (XML) documents.

In one embodiment, if during audio recording the system detects an additional positional stimulus that is not located on or substantially close to an electronic document, control unit 150 generates an additional audio gauge rather than a reference marker. The additional audio gauge may be generated in a manner similar to the first audio gauge described above. In one embodiment, control unit 150 graphically connects multiple audio gauges in the order in which they were generated. Upon audio replay, control unit 150 may sequentially replay the recorded audio in the chronological order that the audio was recorded. In one embodiment, one or more progress indicators may be utilized to display the amount of audio played with respect to each audio gauge. In another embodiment, a single progress indicator that sequentially travels from one audio gauge to another corresponding to the order of audio replay may be used.

In one embodiment, objects such as audio gauges, reference markers, electronic document thumbnails and icons may be repositioned individually or as a group, anywhere on display device 100 using conventional "drag" operations.

In another embodiment, neither the audio gauges nor the reference markers are displayed as recording occurs. However, a data file is appended that includes locations of the referenced documents and timestamps for when the reference occurred. Details on such a data file are described in more detail below.

In one embodiment, the user's voice is recorded along with his or her "deictic" gestures (e.g., references to objects). In one embodiment, an interface includes a number of objects that are displayed on the screen. In such a case, recording begins either when the user presses a "record" button or when the system detects the start of speech through its microphone. Whenever a user touches an object's graphical representation on a touch screen, a time-stamped event is recorded. Recording ends either when the user presses a "stop" button or when the system detects end of speech. When playing back this message, the system plays the audio, and at the appropriate times displays the referred-to objects.

In one embodiment, the system allows the user to record an audio narrative and refer to digital photographs uploaded from a camera simply by touching them on a touch screen. The resulting presentation is stored using the multimedia description languages Synchronized Multimedia Integration Language (SMIL) and RealPix, allowing for playback using the widely distributed RealPlayer. A simple extension allows the user to refer to points or regions within objects, by monitoring the locations "touched" more precisely. On playback, such gestures can become highlighting strokes overlaid on images or documents.

Multimedia Messages

A multimedia message or chronicle is a particular type of audio narrative that includes one or more narration threads and one or more references to various types of electronic documents. Multiple sub-messages, each containing a singular narration thread, may be combined to form a larger multimedia message. Within a multimedia message, it is possible for one or more persons to reference various types of electronic documents including, for example, but not limited to, a Web page with hyperlinks, a slide show containing audio narration, a text document containing text annotations, a scanned document image, a word processor document, a presentation, a digital photograph, etc. The references may refer to the contents of the entire electronic document or to a specific area within the electronic document. A linear ordering of sub-messages may also be specified allowing them to be played back in a default order. As will be described in more detail below with reference to FIG. 16, the messages may also be displayed as being nested and visible to the user upon selection or other input.

Figure 3A:
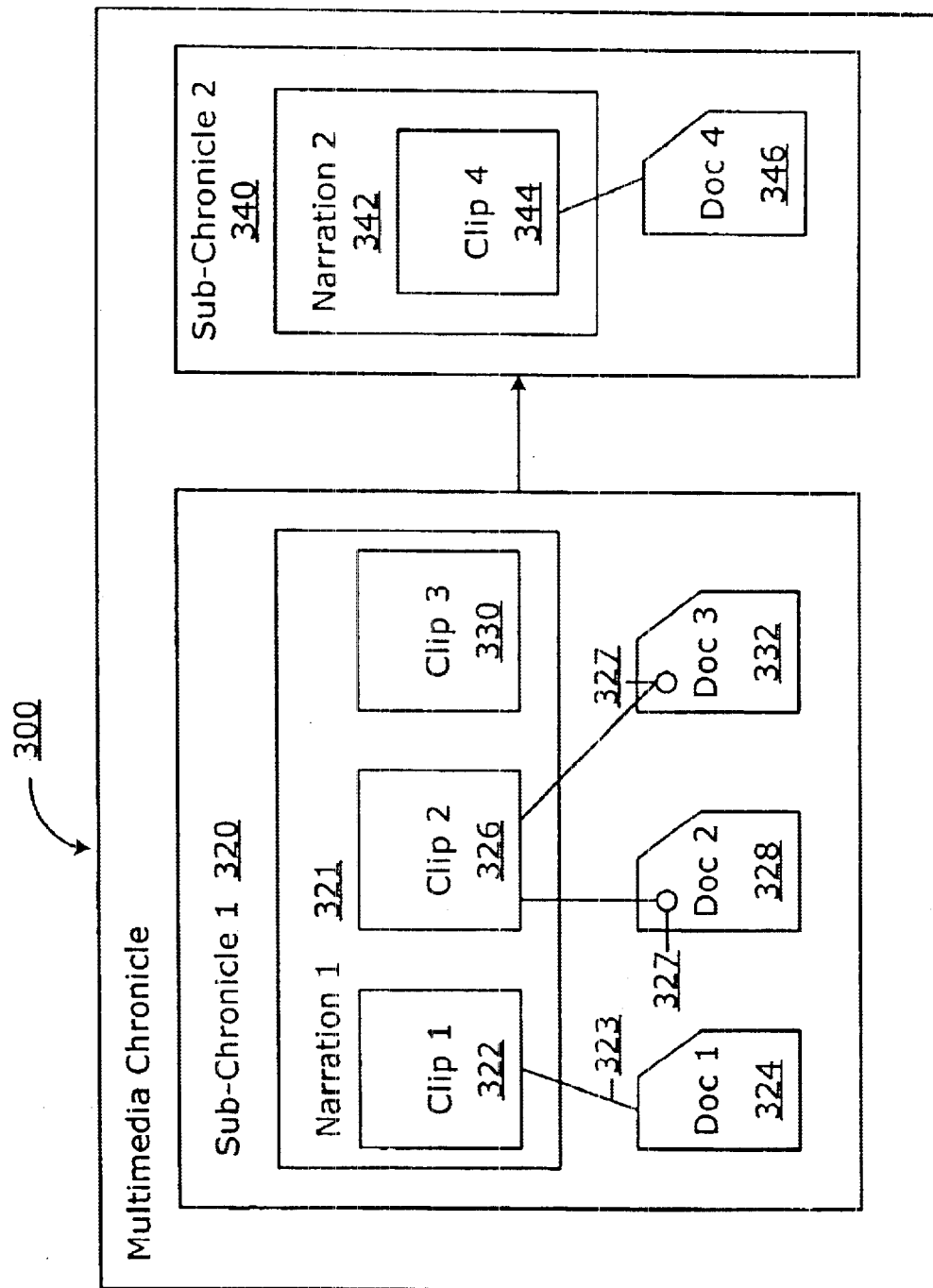
FIG. 3A is a block diagram illustrating one embodiment of an exemplary multimedia message.

FIG. 3A illustrates an exemplary multimedia message. Referring to FIG. 3A, multimedia message 300 includes first sub-message 320 and second sub-message 340. First sub-message 320 comprises narration thread 321, and second sub-message 340 comprises narration thread 342. In one embodiment, a narration thread is a stream of recorded audio that follows a given theme or discussion topic. In FIG. 3A, narration thread 321 is segmented into an ordered list of three separate audio clips, and narration thread 342 of sub-message 340 comprises only single audio clip 344.

Each narration thread may contain one or more references to various electronic documents. For example, narration thread 321 contains one reference to each of electronic documents 324, 328 and 332, for a total of three references. Narration thread 342, however, contains only a single reference to single electronic document 346. Each audio clip within a narration thread may contain any number of references to any number of electronic documents, or no references at all. For example, audio clip 322 contains a single reference to electronic document 324, audio clip 326 contains one reference to electronic document 328 and one reference to electronic document 332, and audio clip 330 does not contain any references.

Each reference may either indicate an entire electronic document, as shown by reference point 323, or optionally indicate a specific area within an electronic document, as shown by reference points 327. The coordinates representing such reference points may have different interpretations depending upon the type of electronic document they are referencing. For example, if the electronic document is an image, coordinates of the reference point may be absolute pixel coordinates. If the document is a web page, however, coordinates of the reference point may be a character position within an HTML file. In the case of a document stored as a series of page images, for instance, a scanned document, the reference point may be a page number plus (x, y) coordinates. Alternatively, if a document is represented by a layout language such as Postscript or PDF (Portable Document Format), the coordinate can be a character position within the file. Then, upon rendering (during playback), this can be translated to a position on the screen.

The multimedia message described above with respect to FIG. 3A may be represented by one or more markup languages including XML and HTML. FIG. 3B illustrates one embodiment of an XML representation for the multimedia message shown in FIG. 3A.

Multimedia Messaging

Electronic mail (email) software usually provides an option by which an original email message may be included in a reply. Typically, an email reply can be interspersed among the lines of the original message, or it can be appended or prepended to the original message as a single block. Multimedia messages may similarly be transferred over a network using a variety of readily available email applications known in the art or other means for distribution of files/electronic data.

FIG. 4A illustrates one embodiment of a multimedia message. Referring to FIG. 4A, electronic document 412 and icon 426 are shown along with two audio gauges 410 and 420 and various reference markers. Electronic document 412 represents a word processing document shown in a reduced "thumbnail" size, whereas icon 426 represents an iconized format of a similar word processing document in which the text of the document is not displayed. In one embodiment, the full text of the electronic document, represented by icon 426, may be viewed by "clicking" or selecting icon 426 with a cursor control input device such as a mouse. Audio gauge 410 is shown graphically connected to electronic document 412 by reference markers 414, whereas audio gauge 420 is shown graphically connected to icon 426 by reference marker 424.

Additionally, audio gauges 410 and 420 are shown connected together by connector 415, which indicates that the two audio clips represented by audio gauges 410 and 420 are chronologically adjacent (420 was recorded subsequent to 410). The connection may only indicate chronological ordering. However, a user can place gauges anywhere on the display. In one embodiment, audio clips recorded by the same user are considered to be related. In one embodiment, the face image of the user who recorded the audio is displayed beside the corresponding audio gauge(s). In FIG. 4A, face image 402 represents user "A" who recorded the audio corresponding to audio gauges 410 and 420. In one embodiment, face images may be captured during recording by a video camera connected to the system, whereas in another embodiment, face images may be accessed from a database.

Once the multimedia message illustrated by FIG. 4A is created, user "A" may send the multimedia message to another user via electronic mail. In one embodiment, in order to send the multimedia message to another user, an XML representation of the multimedia message (such as that shown in FIG. 3B) is created. The XML representation references the various electronic documents and audio clips by way of URL addresses that point to their stored location(s). In one embodiment, the contents of a multimedia message may be transferred to and stored on a designated web server, whereas in another embodiment, the contents may be stored locally on the user's personal computer. In an intranet environment, for example, contents of a multimedia message may reside upon a user's personal computer and yet be accessed by others through a web interface. Once an XML representation of the multimedia message is created, a unique URL pointing to the XML representation is subsequently emailed to another user, say user "B".

Upon receipt of the email containing the XML representation's URL, user "B" may have several viewing options. In one embodiment, upon accessing the URL containing the XML representation, the XML representation is parsed to create and play the message if user "B" has an appropriate application to view the XML representation. In another embodiment, where user "B" does not have an appropriate application to view the XML representation, the message may alternatively be displayed as a standard HTML-based web page. That is, the XML representation containing individual URLs pointing to one or more electronic documents and audio clips is displayed as a list of individual hyperlinks rather than a message. In yet another embodiment, the message may be translated into a Synchronized Multimedia Integration Language (SMIL) formatted file as specified by the World-Wide Web (WWW) consortium. Using a "viewer" such as RealPlayer G2 from Real Networks, Inc., user "B" may view the SMIL message as a slideshow in which the audio clips and corresponding electronic documents and references are simultaneously presented in an order, such as the order in which they were recorded.

Access to the received multimedia message may optionally be limited by access control functions. In one embodiment, a user may retrieve the message only if he or she is the sender or named recipient. In another embodiment, users may be required to authenticate themselves with, for example, a user name and/or password prior to accessing the message.

Figure 4B:
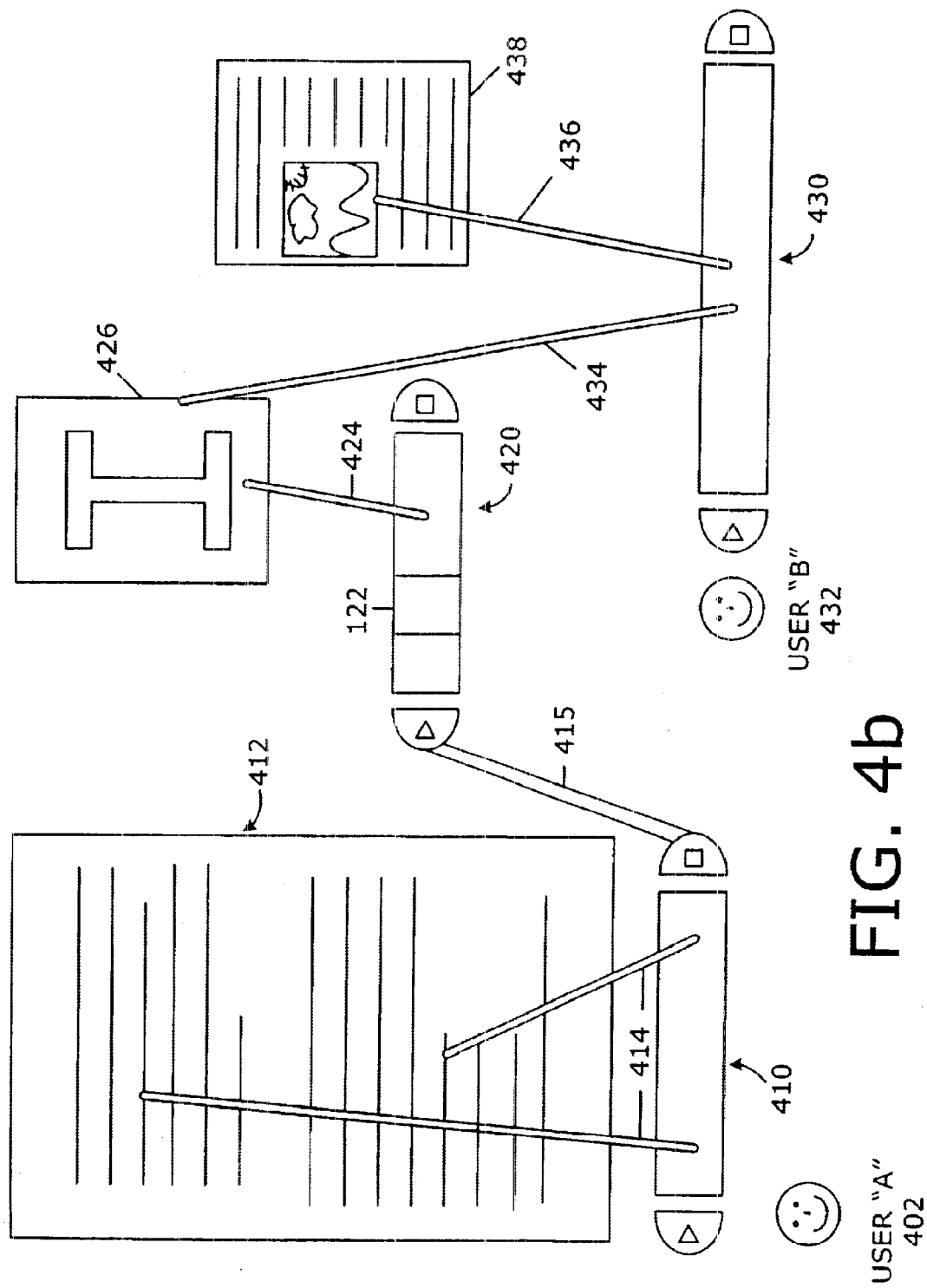
FIG. 4B illustrates one embodiment of a reply to a message containing the multimedia message shown in FIG. 4A.

Once user "B" receives the message, user "B" may reply by adding additional electronic documents and audio clips (represented by audio gauges). FIG. 4B illustrates one embodiment of a reply to an electronic mail message containing the multimedia message shown in FIG. 4A. In addition to the items shown in FIG. 4A, FIG. 4B additionally includes a third audio gauge 430 containing reference markers 434 and 436. Audio gauge 430 represents an audio clip that was added by user "B" to the original message shown in FIG. 4A. In one embodiment, audio gauge 430, created by user "B", is displayed in a different color than audio gauges 410 and 420, created by user "A". Reference marker 436 graphically connects audio gauge 430 with newly added electronic document 438, whereas reference marker 434 graphically connects audio gauge 430 with previously displayed icon 426. User "B" can position a gauge anywhere on screen, but lines shown connecting elements on the display indicate chronological ordering.

Once user "B" enters a response to the message or multimedia message received from user "A", user "B" may send the reply back to user "A" or to some other user or group of users. Assuming the reply is sent back to user "A", in one embodiment, user "A" first hears the additions made to user "A's" message by user "B". That is, upon receipt, user "A" hears the recorded audio represented by audio gauge 430.

Figure 4C:
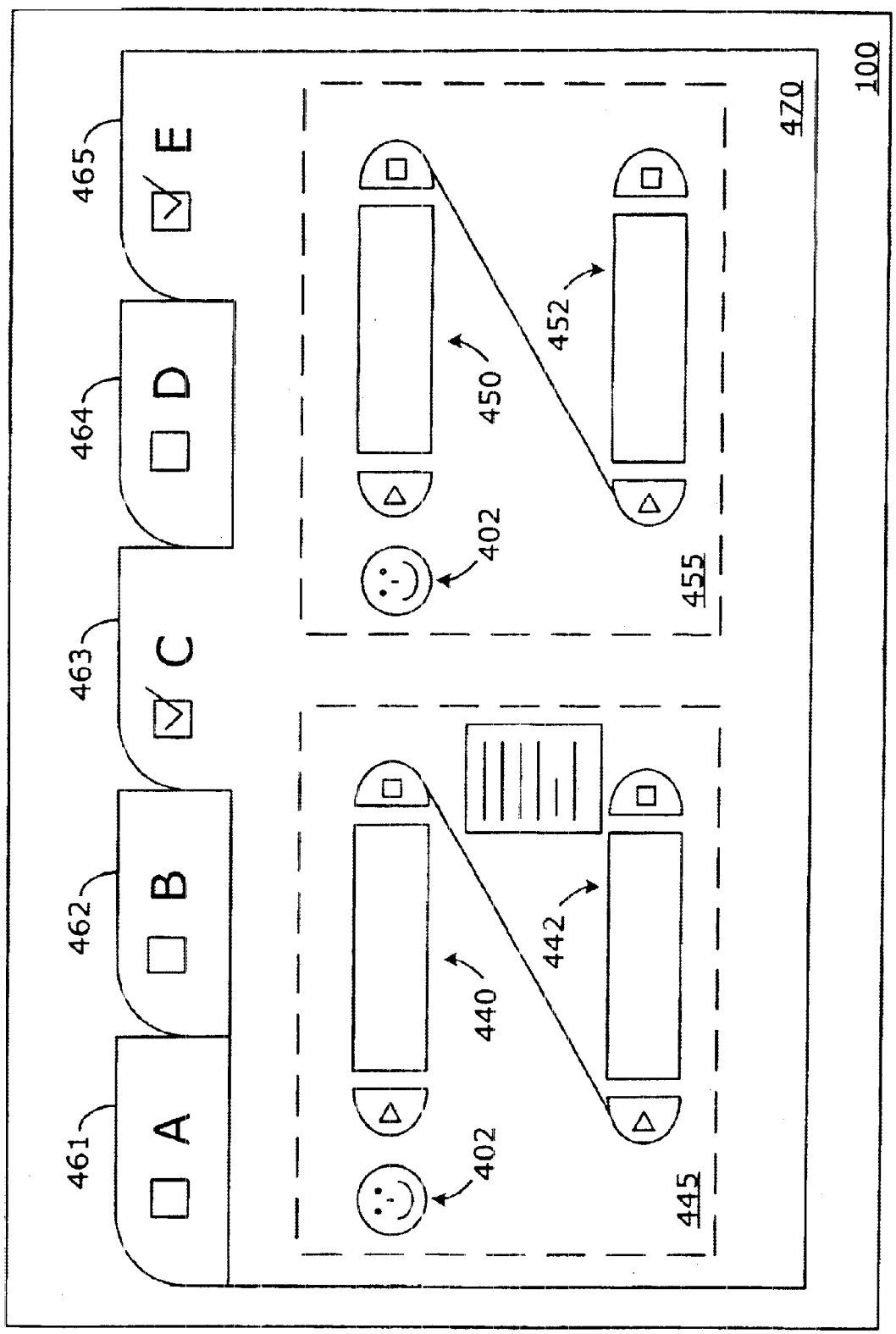
FIG. 4C illustrates one embodiment of a multimedia messaging interface that allows segments of the multimedia message to be selectively viewed.

In one embodiment, a multimedia message may be displayed with separate users' additions or replies being selectively viewable. FIG. 4C illustrates one embodiment of a multimedia-messaging interface that allows segments of the multimedia message to be selectively viewed. Referring to FIG. 4C, messaging interface 465 is displayed upon display device 100. Messaging interface 470 includes audio gauges 440, 442, 450, and 452, faces 402, and tabs 461–465. Audio gauges 440 and 442 represent audio previously recorded by end user "A" (face 402), and audio gauges 450 and 452 represent audio currently being composed by end user "A". In one embodiment, each of tabs 461–465 is individually selectable and each may represent one segment of an ongoing conversation between user "A" and another user, such as user "B". For example, when selected, tab 461 displays an original message from user "A" to user "B". Tab 462 on the other hand displays user "B's" reply to user "A's" original message when selected. Likewise, when selected, tab 463 displays user "A's" reply (shown by bounding box 445) to user "B's" reply. In one embodiment, any number of past messages or replies may be selectively viewed while a new message or reply is being composed. For example, user "A's" reply (associated with tab 463 and shown by bounding box 445) is concurrently displayed with a message that user "A" is in the process of composing (associated with tab 465 and shown by bounding box 455). Once user "A" completes the message currently being composed, user "A" electronically mails the message in the manner described above. Tabs 461–465 may be labeled with the time of creation of the corresponding messages, as well as the names of the originators of the messages.

Three-Dimensional Walkthroughs

A method and apparatus for recording and playback of multidimensional walkthrough narratives is disclosed. A three dimensional modeling language is used to automatically create a three-dimensional environment using pre-existing electronic documents. The objects are 3D. In one embodiment, they are shown on a 2D display such as display device 100. In another embodiment, a stereo 3D display (e.g., head-mounted glasses) can be used.

A first user, or author, may navigate throughout the three-dimensional environment while simultaneously recording the path taken and any accompanying audio input. In one of two playback modes, a second user can be shown a "walkthrough" of the three-dimensional scene corresponding to the path taken by the author. In the other playback mode, a second user is free to navigate the three-dimensional world while the author's path is displayed.

Generation

Figure 5:
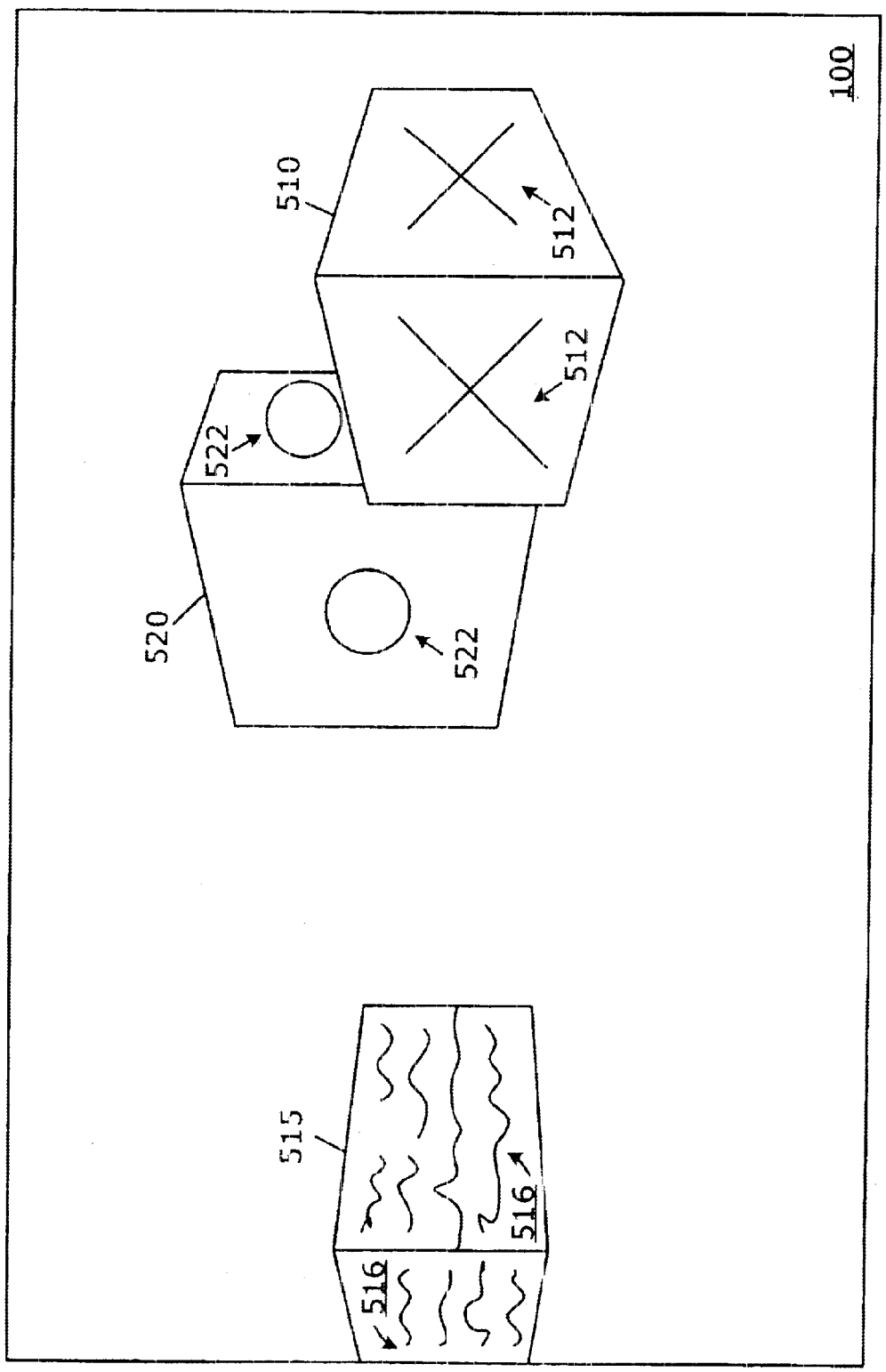
FIG. 5 illustrates one embodiment of a three-dimensional environment.

FIG. 5 illustrates one embodiment of a three-dimensional environment. Referring to FIG. 5, display device 100 is shown displaying a three-dimensional environment or world containing cubes 510, 515 and 520. In one embodiment, the three-dimensional environment is empty except for cubes 510, 515 and 520. In another embodiment, the three-dimensional environment may contain additional aesthetic or substantive features as may be desired.

Cubes 510, 515 and 520 are depicted in FIG. 5 as being three-dimensional and set within the three-dimensional world. In other embodiments, cubes 510, 515 and 520 may be replaced by other figures of varying shape. In one embodiment, for example, the cubes may be replaced by three-dimensional spheres, whereas in another embodiment, the cubes may be replaced by three-dimensional cylinders or rectangular prisms. Figures of varying size and shape may be used without departing from the spirit and scope of the invention.

FIG. 5 additionally shows electronic documents 512, 516 and 522 displayed upon cubes 510, 515 and 520 respectively. In a three-dimensional environment, electronic documents 512, 516 and 522 appear as being superimposed upon cubes 510, 515 and 520. In one embodiment, electronic documents 512 and 522 represent digital photographs, whereas electronic document 516 represents a word processing document. Additional forms of electronic documents may include without limitation, digitized audio and video, electronic spreadsheets, electronic databases, hypertext markup language and web documents, and electronic mail. Electronic documents 512, 516 and 522 may represent similar types of content and media not described herein.

In one embodiment, a two-dimensional reduced-size "thumbnail" image is created and superimposed upon a three-dimensionally rendered figure such as cubes 510, 515 and 520. In such a manner, a two-dimensional image can be converted into a three-dimensional representation of that image. In one embodiment, cubes 510, 515 and 520 are defined through extended markup language (XML). In another embodiment a three-dimensional modeling language such as VRML, 3DML, and X3D may be used. As each three-dimensional figure is generated, it is displayed within the three-dimensional environment. In one embodiment, each three-dimensional figure is randomly placed or displayed within the three-dimensional environment as it is generated. In another embodiment, each three-dimensional figure is displayed with respect to other preexisting three-dimensional figures according to a placement scheme. In one embodiment, placement schemes are based upon characteristics of the electronic documents contained within the three-dimensional figures. Examples of placement schemes include, without limitation, time of creation, content, and media type. In yet another embodiment, the three-dimensional figures are displayed at a pre-determined fixed distance from one another. By displaying the three-dimensional figures according to various placement schemes, it is possible for an author to group or cluster certain types of information together to help guide user understanding. In one embodiment, the user, or one who navigates the three-dimensional environment after creation, is able to rearrange the three-dimensional figures according to his own organizational preference.

Recording

Once the three-dimensional environment is created, a user may navigate it. In one embodiment, navigation is possible through the use of a readily available "player" application including a virtual reality modeling language (VRML) viewer such as Cosmo Player available from Silicon Graphics, Inc., of Mountain View, Calif., or a three dimensional modeling language (3DML) viewer such as Flatland Rover available from Flatland Online Inc., of San Francisco, Calif. In one embodiment, a special class of user, called an author, is able to navigate through the three-dimensional environment while the author's virtual movements are recorded. The term "recording" as used herein is meant to describe the process of retaining navigational and audio input as generated by a user with respect to the three-dimensional environment.

In an exemplary embodiment, an author navigates through a three-dimensional environment while a processing device, such as processor 102, causes the author's movements to be recorded. Any audio narrated by the author while navigating is also recorded, thus creating a walkthrough. In one embodiment, as the audio is recorded, it is segmented so as to divide the audio into multiple audio clips of varying duration according to a segmenting scheme. The audio may be recorded as described above. Thus, in one embodiment, a 2D multimedia message is created and viewed as a 3D walkthrough, and vice versa. Similarly, in another embodiment, video content may be recorded and segmented in lieu of audio. As the author navigates toward a three-dimensional figure, the electronic document superimposed upon the figure appears larger to the author. By approaching the figure, the author may take a closer look at the figure or electronic document contained thereon. If so equipped, the player application may also provide the author the opportunity to view the electronic document in a separate, full-screen display, in another part of the display, or in a dedicated portion of the display overlaying the walkthrough.

Figure 6:
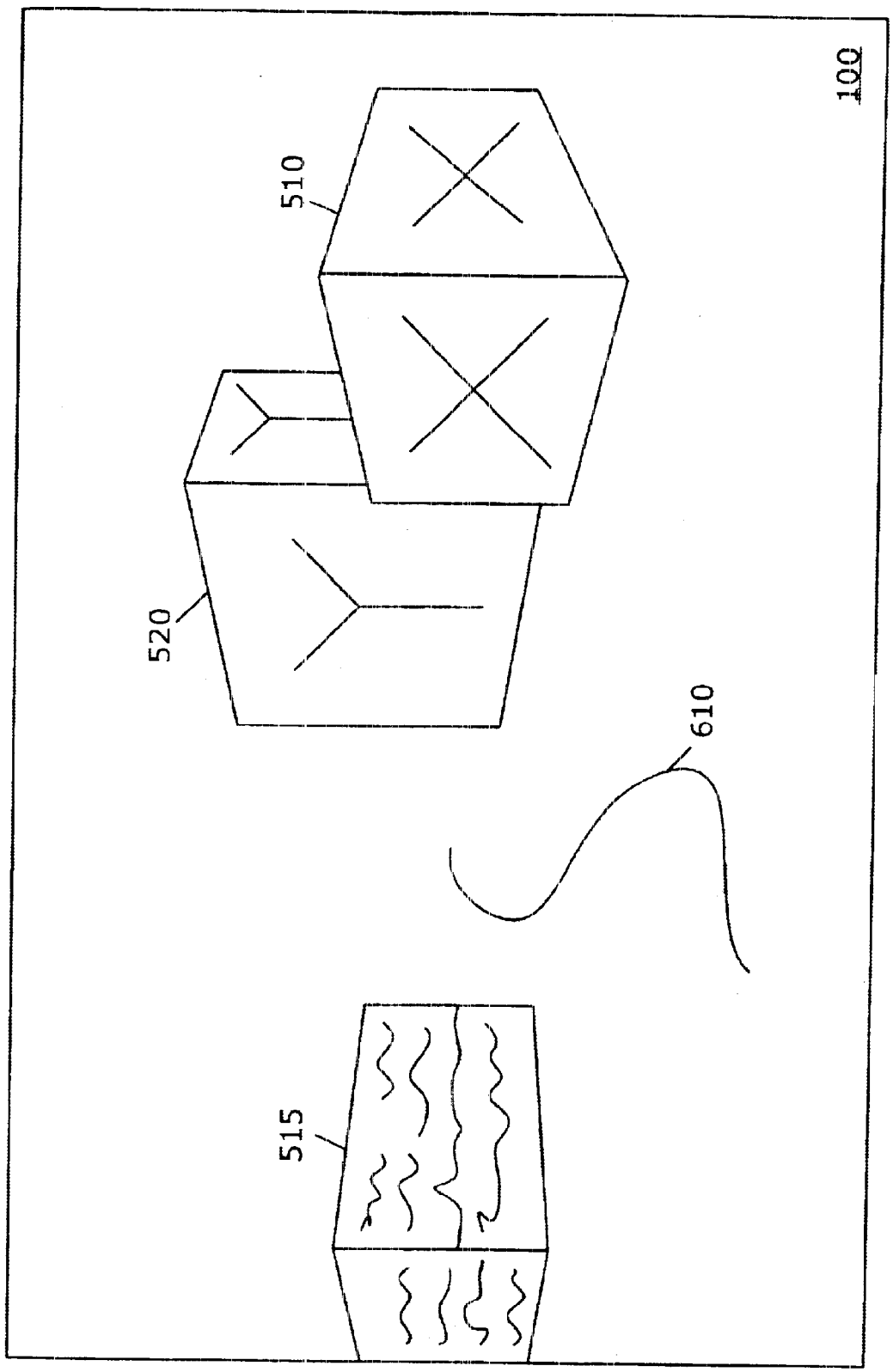
FIG. 6 illustrates one embodiment of a three-dimensional environment showing a path.

FIG. 6 illustrates a three-dimensional environment showing a recorded path according to one embodiment of the present invention. Referring to FIG. 6, display device 100 is shown displaying a three-dimensional environment containing three-dimensional cubes 510, 515 and 520, and path 610. Path 610 represents a path through which an author has navigated. Path 610 is shown as a line, but in other embodiments may take the form of various other shapes. In one embodiment, path 610 is displayed in a single color, while in other embodiments, path 610 may be displayed in multiple colors, or may appear semitransparent.

Figure 7:
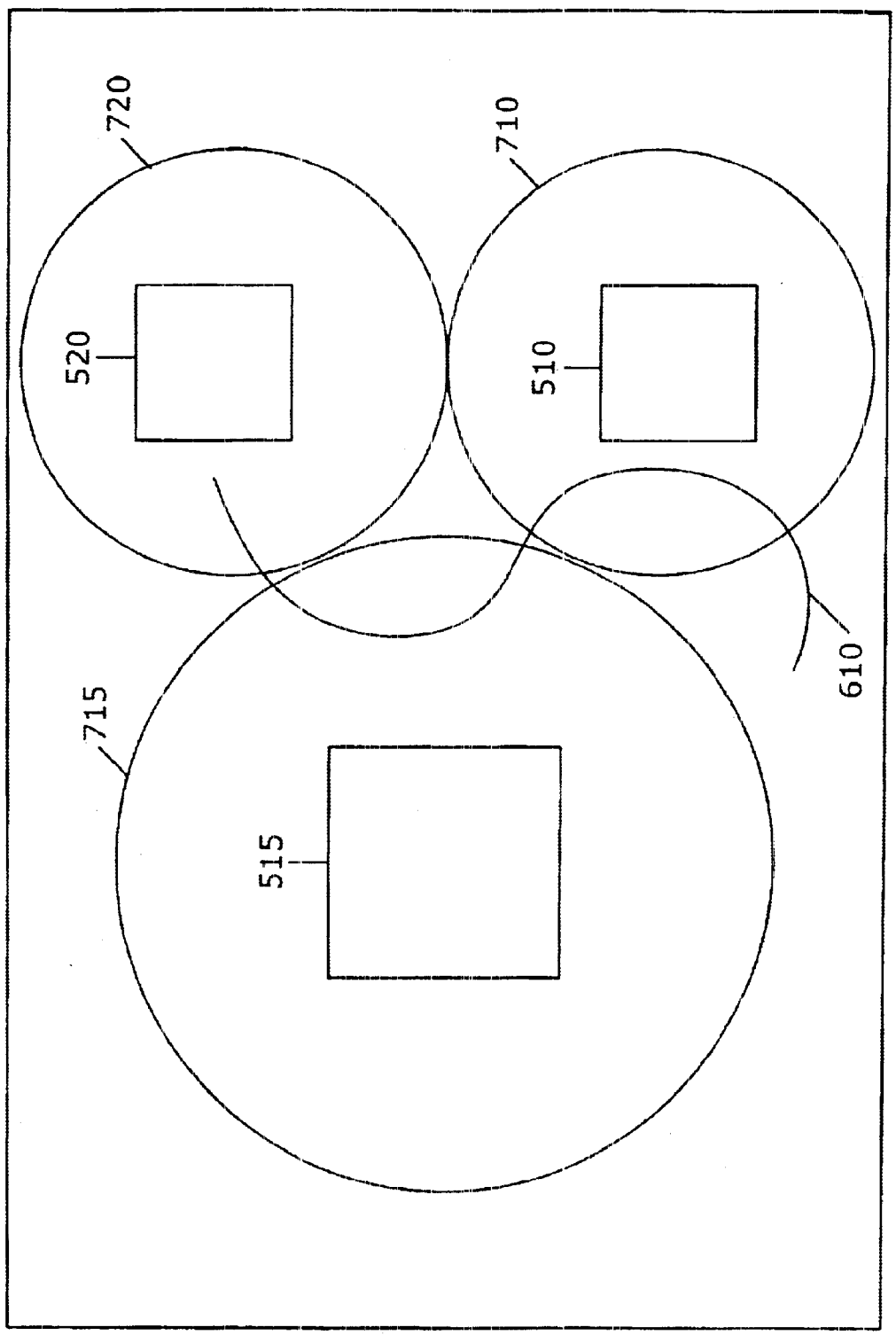
FIG. 7 illustrates a two-dimensional top view of the three-dimensional environment of FIG. 6.

FIG. 7 illustrates one embodiment of a two-dimensional top view of the three-dimensional environment shown in FIG. 6. Referring to FIG. 7, three-dimensional cubes 510, 515 and 520 are shown within proximity indicators 710, 715 and 720 respectively. In one embodiment, each of proximity indicators 710, 715 and 720 represents a bounded area that is associated with a particular media clip or segment. In one embodiment, the media clip contains audio content, whereas in another embodiment, the media clip contains video content.

In one embodiment, each proximity indicator is associated with an audio or a video segment that presumably relates to the three-dimensional figure bounded by the proximity indicator. In one embodiment, multiple three-dimensional figures may exist within a single proximity indicator, and in another embodiment, multiple proximity indicators may bound a single three-dimensional figure.

Playback

A user of the three-dimensional multimedia narrative described herein can choose whether to pursue playback of the recorded three-dimensional walkthrough in passive or active modes.

According to one embodiment, in a passive mode, the playback is movie-like in that the user is shown a three-dimensional walkthrough corresponding to the path taken by the author when the walkthrough was recorded. In one embodiment, audio narration that was recorded by the author is also played while in a passive mode. As documents are passed in a passive mode, the viewing user can also view the source of the documents in a separate window or viewing application.

In an active playback mode, the user is free to navigate the three-dimensional environment without being limited by the author's previously taken path. According to one embodiment of the present invention, while in active mode, the author's path remains visible as the user navigates through the three-dimensional environment. In yet another embodiment, segmented audio recorded by the author is played as the user approaches a related three-dimensional figure. Referring once again to FIGS. 6 and 7, as a user navigates along the author's path 610 and approaches cube 510, the user hears an audio segment recorded by the author while the author was within proximity indicator 710. In one embodiment, the audio would not be played until the user navigated to within the area bounded by proximity indicator 710. In another embodiment, the loudness of the audio may increase as the user approaches cube 510. Additionally, stereo effects may be used to locate audio within three-dimensional space corresponding to the position of the cube in the virtual three-dimensional environment.

Automatic Thumbnail Generation

Figure 8:
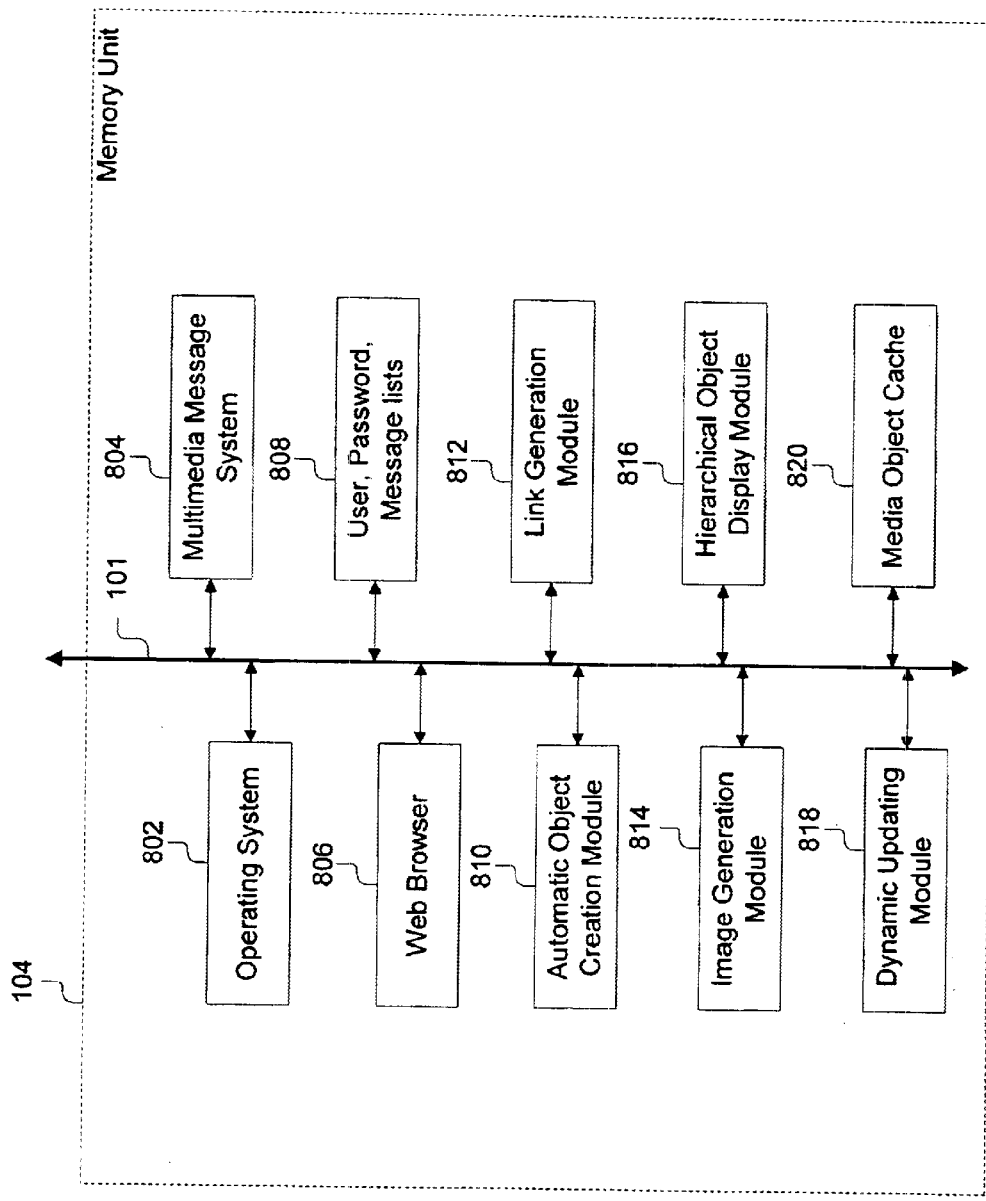
FIG. 8 is a block diagram of a preferred embodiment of the memory unit in accordance with the present invention.

System Overview. Referring now to FIG. 8, the memory unit 104 is shown in more detail. In particular, the portions of the memory 104 needed for the automatic processes of the present invention are shown and will now be described more specifically. As shown in FIG. 8, the memory unit 104 preferably comprises an operating system 802; a multimedia message system 804; a web browser 806; a memory 808 storing user identification numbers, passwords, objects identification numbers, and lists of attachable objects storage; an automatic object creation module 810; a link generation module 812; an image generation module 814; a dynamic updating module 818; a hierarchical display module 812; and a media object cache 820. As noted above, the memory unit 104 stores instructions and/or data that may be executed by processing unit 102. The instructions and/or data may comprise code for performing any and/or all of the techniques described herein. These modules 802–820 are coupled by bus 101 to the processing unit 102 for communication and cooperation to provide the system 120 for multimedia messaging that further provides a capability for generation of thumbnail images, automatic updating of thumbnail images, and hierarchical display of objects. Those skilled in the art will recognized that while the present invention will now be described as modules or portions of a memory 104 of a computer system, the modules or portions may also be stored in other media such as permanent data storage and may be distributed across a network having a plurality of different computers such as in a client/server environment.

The operating system 802 is preferably one of a conventional type such as, WINDOWS®, SOLARIS® or LINUX® based operating systems. Although not shown, the memory unit 104 may also include one or more application programs including, without limitation, word processing applications, electronic mail applications, spreadsheet applications, and web browser applications.

The multimedia message system 804 is preferably a message system for creating, storing, sending and retrieving rich multimedia messages. The functionality for such a system has been described above with reference to FIGS. 1–7. The messages may include audio, text, video, graphics, etc., and each message is a collection of objects and commentary in a structure referred to as a message object. The multimedia message system 804 operates on messages that include by reference one or more other messages. For example, a message may include an initial message and the replies of several addressees as well as all the portions of those messages such as text, video, graphics, etc. For the present invention, chronicles and messages will be considered the same and the terms are used interchangeably. Such messages or chronicles are stored in the memory 808 or media object cache 820 as will be described in more detail below. The multimedia message system 804 allows users to create messages, send messages, delete messages, reply to messages, and retrieve messages. An exemplary multimedia message system 804 is the messaging system developed by Ricoh Silicon Valley of San Mateo and Menlo Park, Calif.

The multimedia message system 804 is preferably a computer or server that includes programs and routines for providing the messaging functionality described above with reference to FIGS. 1–7. For example, the server could be a web server that stores messages (XML+related/referenced media objects) and makes the messages accessible to others via HTTP.

Today, it is well understood by those skilled in the art that multiple computers can be used in the place of a single computer by applying the appropriate software, hardware, and communication protocols. For instance, data used by a computer often resides on a hard disk or other storage device that is located somewhere on the network to which the computer is connected and not within the computer enclosure itself. That data can be accessed using NFS, FTP, HTTP or one of many other remote file access protocols. Additionally, remote procedure calls (RPC) can execute software on remote processors not part of the local computer. In some cases, this remote data or remote procedure operation is transparent to the user of the computer and even the application itself because the remote operation is executed through the underlying operating system as if it were a local operation.

It should be apparent to those skilled in the art that although the embodiment described in this invention refers to a single computer with local storage and processor, the data might be stored remotely in a manner that is transparent to the local computer user or the data might explicitly reside in a remote computer accessible over the network. In either case, the functionality of the invention is the same and both embodiments are recognized and considered as possible embodiments of this invention.

For example, FIG. 8 shows the multimedia message system 804 that is described as running in memory unit 104. However, memory unit 104 could be a virtual memory unit and bus 101 could be a virtual bus. In other words, the processes and data that represent multimedia message system 804 could reside and execute on a separate computer that is part of the network that makes up memory unit 104. The bus 101 would then be the network hardware and protocols that allow each component of memory 104 to communicate. The overall operation of the system is unaffected by the location of the data or process execution—particularly when it is done transparently to the user or the application.

The web browser 806 is of a conventional type that provides access to the Internet and processes HTML, XML or other mark up language to generated images on the display device 100. For example, the web browser 806 could be Netscape Navigator or Microsoft Internet Explorer.

The memory 808 for users, passwords, message distribution lists and media objects is shown as being connected to the bus 101 for access by the various modules 802–818. The memory 808 is distinctive from the prior art in that the memory also stores objects information as will be described in more detail below with reference to FIG. 9. Those skilled in the art will recognize that this information is preferably stored as part of the multimedia message system 804, and thus be accessible through the multimedia message system 804. Those skilled the art will realize that this memory may be part of the multimedia message system 449 804 and cached locally for remote users or remote applications. The memory 808 could also be a database that stores user identification numbers and passwords used for comparison and authorization for access, objects or those constituent portions that form the messages, and list of attachable objects or documents.

The automatic object creation module 810 is coupled to the bus 101 for communication with the multimedia message system 804, the link generation module 812, the image generation module 814, the dynamic updating module 818 and the hierarchical display module 816. The automatic object creation module 810 interacts with these components as will be described below with reference to FIGS. 12–17 to generate thumbnail images of messages and links between messages, and display those thumbnail images and links on the display device 100. The automatic object creation module 810 also interacts with the dynamic updating module 818 when the thumbnail images need to be re-created because of modification to an existing object. More specifically, the automatic object creation module 810 receives user input via the multimedia message system 804 and translates those data and control signals, input commands and data to the link generation module 812 and the image generation module 814 that generated the thumbnail images and the references or links to the original data. For example, this automatic object creation module 810 creates an instance of the object of FIG. 9 (see below). The functionality provided by the automatic object creation module 810 is described in detail in FIGS. 12–17.

The link generation module 812 is responsive to the automatic object creation module 810 and receives and sends commands, and determines and provides references or links to underlying data to the automatic object creation module 810 and the multimedia message system 804. The links and references can then be displayed or embedded into objects for future use. The operation of the link generation module 812 can be best understood with reference to FIGS. 12–14. The link generation module 812 communicates with the multimedia message system 804 to receive references to existing messages and/or objects. The link generation module 812 also communicates with the web browser 806 to get hypertext links to web pages stored on the Internet, or cached and stored as part of an intranet or the multimedia message system 804 itself.

The image generation module 814 is responsive to the automatic object creation module 810 and receives and sends commands, and determines and provides thumbnail images of underlying data to the automatic object creation module 810 and the multimedia message system 804. The thumbnail images can then be displayed and/or embedded into objects for future use. The operation of the image generation module 814 can be best understood with reference to FIGS. 12–15. The image generation module 814 communicates with the multimedia message system 804 to receive references to objects, and then generates an image of an identified object. Such objects can be messages, web pages, documents, or any image being displayed by the multimedia message system 804. Furthermore, it should be understood that the images once retrieved, are usually a reduced representation of the image that are scaled down, sub-sampled, cropped or otherwise reduced for the display context. The image generation module 814 also communicates with the multimedia message system 804 to capture the image and produce a thumbnail image.

The hierarchical display module 816 controls the display of images in conjunction with the multimedia message system 804. The hierarchical display module 816 provides for the display of the thumbnail images of an object, and responsive to user input will display the corresponding original content (message, object, web page, or link) from which the thumbnail image was generated. The hierarchical display module 816 can be best understood with reference to FIG. 16. The hierarchical display module 816 works with and may be integrated as part of the display routines of the multimedia message system 804. The hierarchical display module 816 is particularly advantageous because it provides a powerful manner in which to display messages and their components in a nested fashion, and automatically retrieves and displays a thumbnail for a message if there are multiple objects in the message or the object itself if there are not additional objects or layers of nesting.

The dynamic updating module 818 works in conjunction with the multimedia message system 804, automatic object creation module 810 and the image generation module 814. The dynamic updating module 818 controls the updating of any thumbnails automatically upon modification of an existing message by any user. The operation of the dynamic updating module 818 can be best understood with reference to FIG. 17. The dynamic updating module 818 communicates with the multimedia message system 804 to receive signals indicating when and how an existing message has been modified. These signals may be received via a network from another messaging system. In one embodiment, an updating unit registers all displayed (embedded) messages with an update service. (Each message is assigned a globally unique ID). The message system 804 notifies the update service whenever an existing message is modified by a user. The update service then notifies all registered updating units. In response, the dynamic updating module 818 determines other instances where the object or message is displayed as a thumbnail image, and then creates a new thumbnail image and updates all objects that have an outdated image. In this manner, the present invention ensures that the thumbnail images are an accurate reflection of the current state of a message or object and provide an invaluable source of information to the users of the system.

The media object cache 820 forms a portion of memory 104 and temporarily stores media objects used by the multimedia message system 804 for faster access. The media object cache 820 stores media objects identical to those stored on the data storage device 107 or other storage devices accessible via the network controller 124. The media objects have the same format and information as will be described below with reference to FIG. 9. By storing the media objects in the media object cache 820, the media objects are usable by the various modules 802–818 with less latency.

Figure 9:
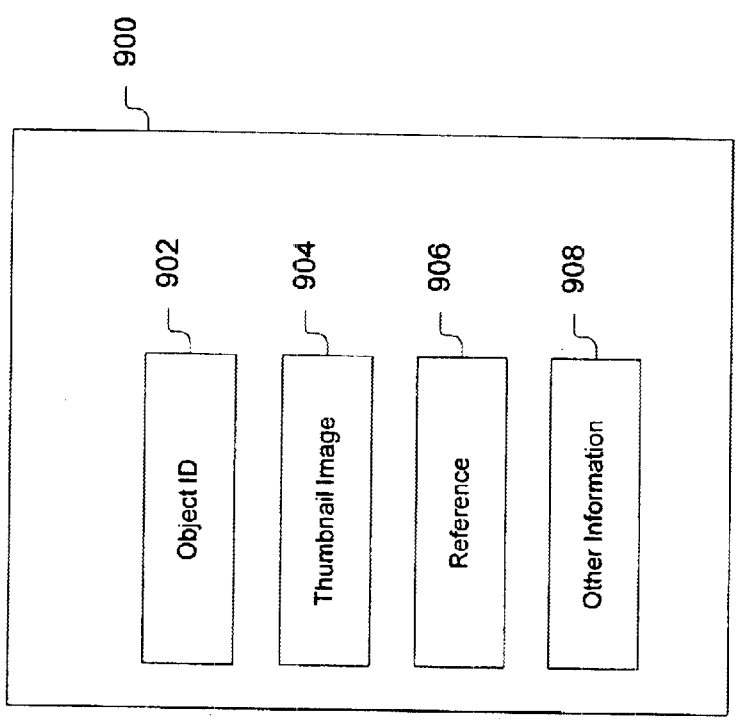
FIG. 9 is a graphical representation of a preferred embodiment of an object that is a portion of a message according to the present invention.

Referring now to FIG. 9, portions of an object structure 900 relevant to the present invention are shown. The present invention uses objects 900 to represent messages and components of messages. For each message or component, the present invention provides an object 900 having a variety of fields and attributes in addition to those described above for messages generally. In order to provide for much of the automation of display and image generation provided by the present invention, each object preferably has additional fields including: an object identification field 902, a thumbnail image field 904, a reference or link field 906, and a miscellaneous field 908 for storing other data used in the methods described below. The object identification field 902 is used to provide each object with a unique identification number. The thumbnail image field 904 is used to store an image corresponding to the object. This field is used to store a generated image, to provide data for display, and to change data when an image is updated. The reference or link field 906 is used to store a link to the original source from which the image in thumbnail image field 904 was generated. This field can store hypertext links or references to other messages stored by the system 804. The miscellaneous field 908 stores other data used in the methods described below and used in the method of FIGS. 12–17. In other words, each object stored in the multimedia message has primarily three elements: 1) a source (which might be a URL or a filename), 2) an image that represents it (which might be from a screen capture or might be rendered offline, or retrieved from a database of pre-rendered images or it could be an icon that represents the type of data stored in the object), and 3) a reference to a cached object. Some objects might be cached so that if the information pointed to with the source changes, the cached object is still available. Whenever an object is created, the reference or source is saved, an image is chosen, generated, or captured, and the information is cached on the multimedia server 804. Some of this information is redundant in some cases. For better understanding of the present invention some examples are shown below in the table for particular actions.

If you drag an image off of your hard disk:

| | |
|---|---|
| Source | Original file name |
| Image | New Unique ID assigned to this image file that is now stored on the MMS 804 |
| Cache | Original image contents - same as "Image" above |

If you drag in a web page

| | |
|---|---|
| Source | URL of web page |
| Image | Captured image from screen. This image file is assigned a new unique ID and is now stored on the MMS 804 |
| Cache | Original web page contents |

If you drag an image off of the web page:

| | |
|---|---|
| Source | URL of web page |
| Image | Image downloaded from web page. This image file is assigned a new unique ID and is now stored on the MMS 804 |
| Cache | Original web page contents |

Drag in a message:

| | |
|---|---|
| Source | Unique message ID |
| Image | Image that was created to represent this message at the time the message was created. |
| Cache | Not necessary because this message is already stored on the MMS 804. In other words, the cached message is the same as the original message pointed to by "source" |

There is other data 908 that might be stored with the objects, but Source, Image, and Cache are the fundamental required data.

Figure 10:
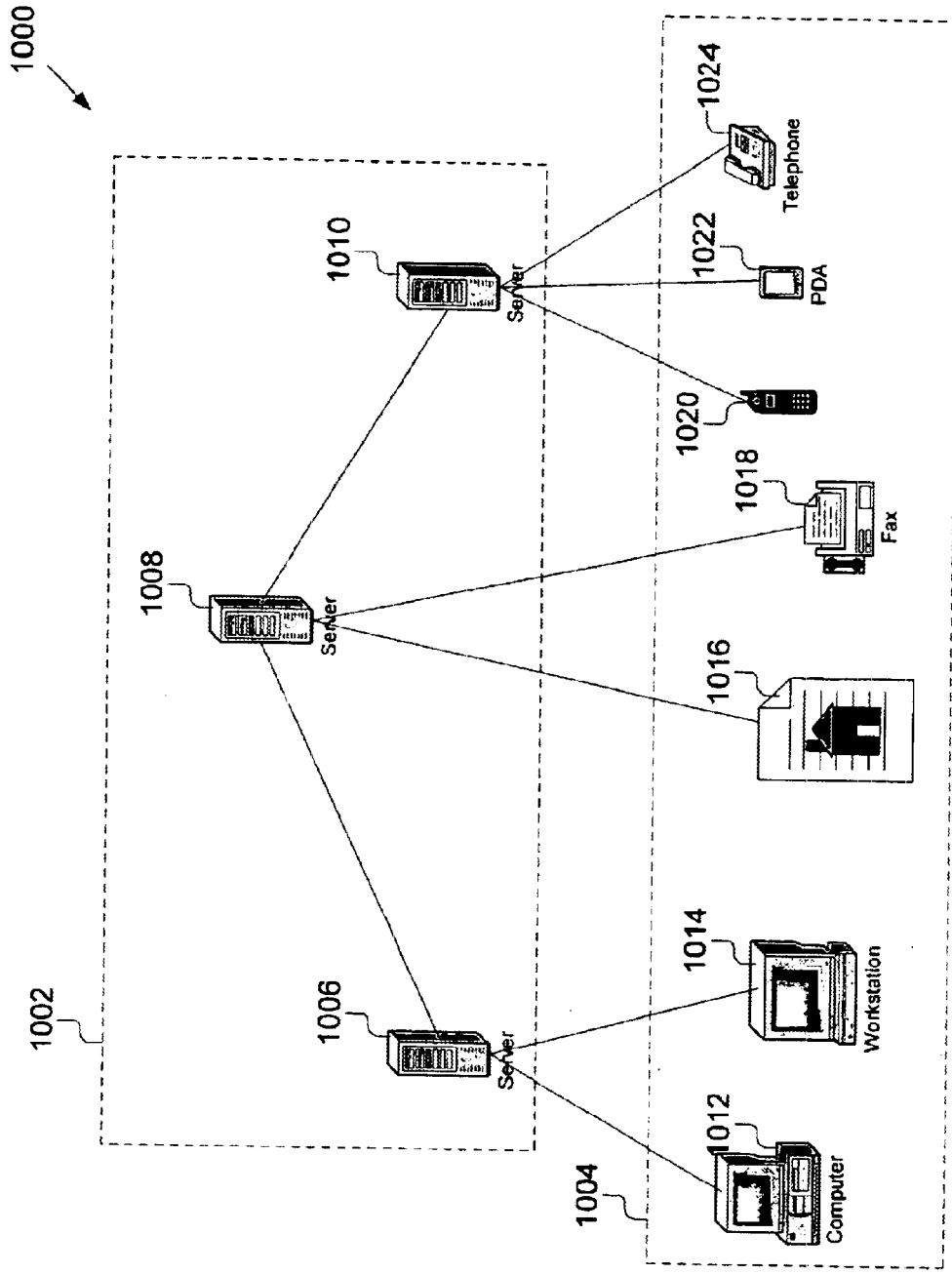
FIG. 10 is a block diagram of an exemplary embodiment of a multimedia conversation system constructed in accordance with the present invention.

To better understand the operation of the present invention, an exemplary architecture for multimedia conversation system 1000 constructed in accordance with the present invention is shown in FIG. 10. The system 1000 preferably includes a plurality of multimedia conversation (MMC) servers 1002 and a plurality of MMC client devices 1004. The MMC servers 1002 are coupled to each other for communication and coupled to respective MMC client devices 1004. The architecture also illustrates the distinctive types of clients that may be connected to the multimedia conversation system 1000. The devices can be computers with full functionality for communicating in the audio and visual domains, or more limited devices such as phones, fax machines, and PDAs. Those skilled in the art will recognize that the messaging system is maintained over the group of devices included as part of the system and that any individual machine includes the capabilities of the system to send, receive, create, and present messages.

Figure 11:
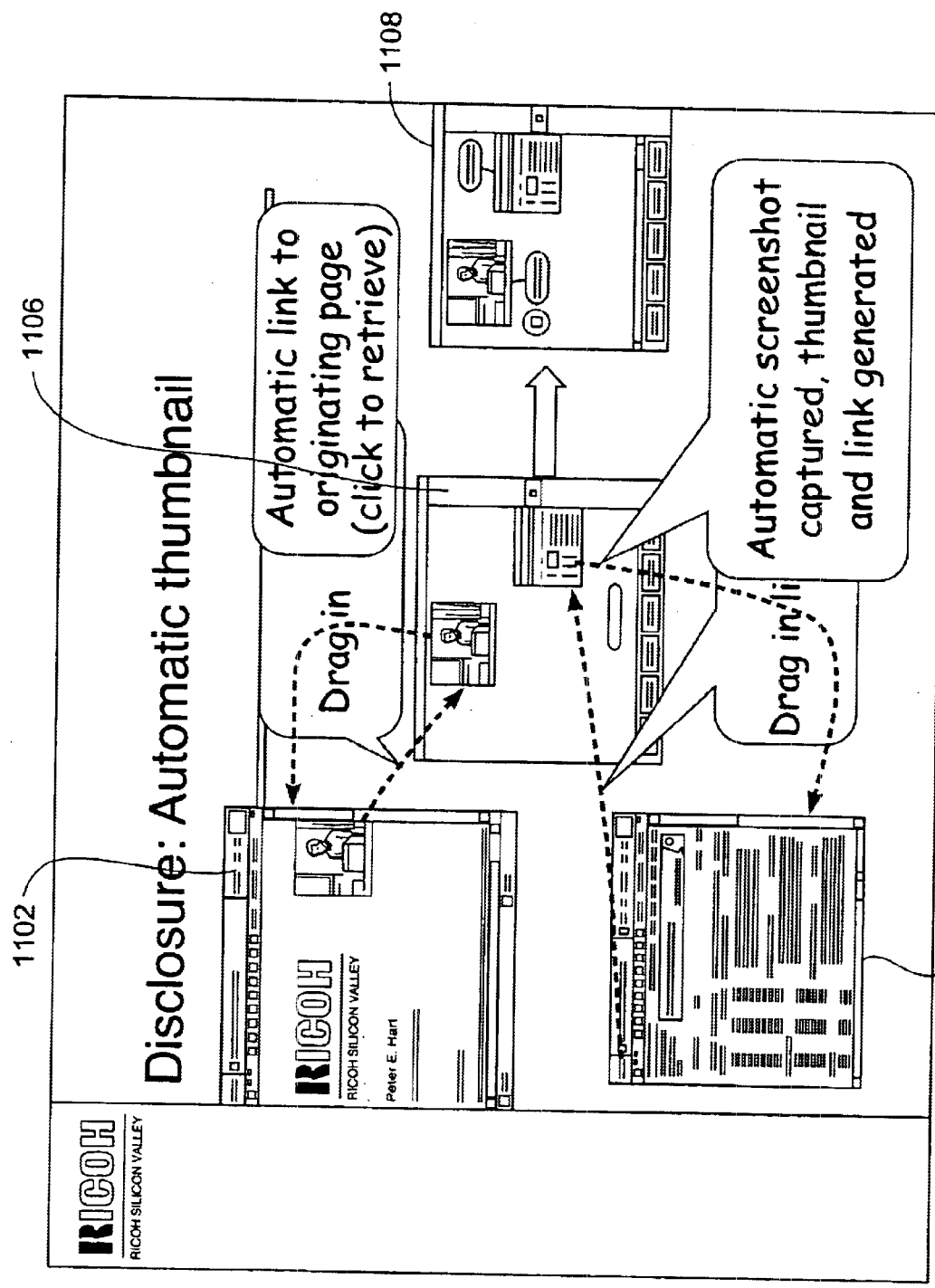
FIG. 11 is a graphical representation of windows provided by the multimedia conversation system and the automatic creation of new objects.

Overview of Automatic Thumbnail Generation Process. Referring now to FIG. 11, a graphical representation of a display device 100 having a plurality of windows provided by the multimedia conversation system 804 and the process of automatic creation of new objects is illustrated. As shown in FIG. 11, the present invention provides drag and drop functionality for creating thumbnail images and links to existing information for use in a multimedia messaging system 804. FIG. 11 illustrates a plurality of windows 1102, 1104, 1106 and 1108. A first window 1102 is a web page from which the image was just dragged in. A second window 1104 is a web browser showing a particular web page. A third window 1106 is a composition window for creating a new message in the multimedia messaging system 804. The fourth window 1108 is the resulting window after the user has input that the content of the first and second windows should be added in to a message being created. This input is by dragging in an image object (component) from a window 1102, or an entire page window (message) 1104 into a composition window 1106. As can be seen, the user need only drag and drop an entire message or component object from a first window 1102 (or 1104) into the third window 1106, and the system automatically generates a thumbnail image of the message or component object and a link to the original page or message. Similarly, the user need only drag and drop a web page display in the second window 1104 into the third window 1106, and the system automatically captures a thumbnail image of the web page, determines the hypertext link to the page and creates an object in the third window 1106. The methods of the present invention providing such ease of use functionality are described below with reference to FIGS. 12–17 and provide the automatic generation of message objects and references in response to the user actions of: 1) dragging an image component of an existing message into a composition window; 2) dragging a whole message into a composition window; and 3) dragging a whole web page into a composition window.

Figure 12:
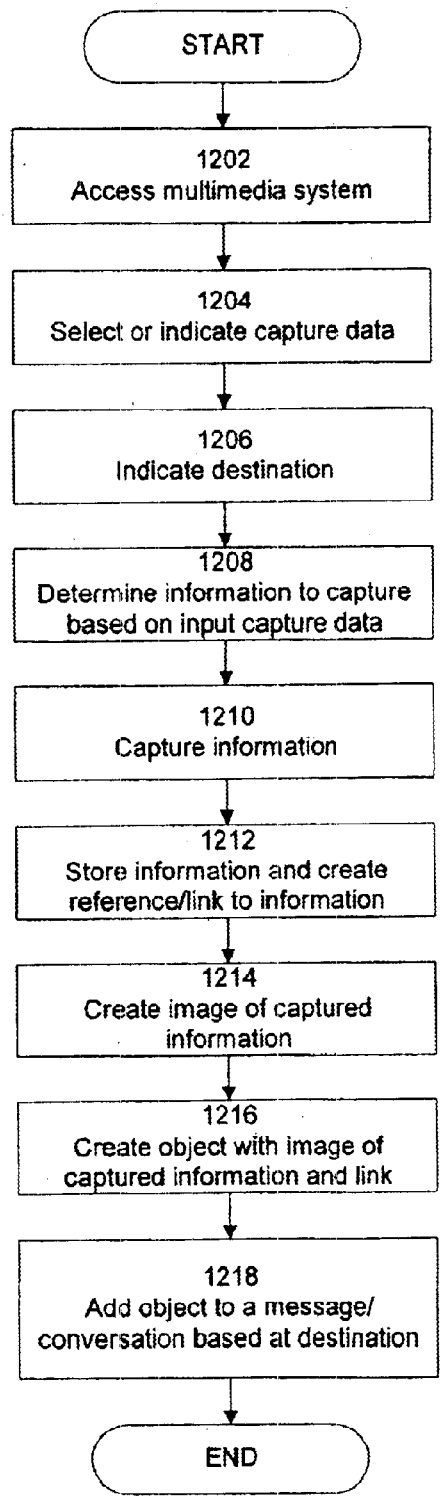
FIG. 12 is a flow chart of a preferred method for automatically creating images of objects in accordance with the present invention.

Referring now to FIG. 12, a preferred method for automatically creating images of objects for a multimedia message system 804 will be described. The process begins in step 1202 with the multimedia message system 804 being accessed by a user. The user may be accessing any of the base functionality described above with reference to FIGS. 1–7. Then in step 1204, the user selects or indicates capture data. The user selects either a window that contains a web page, an intranet page, a message thumbnail or window, or a component of a web page, message or other object as the image to be captured. The present invention allows a variety of components to be added (dragged) into a message such as: 1) a web page, 2) an image from a web page, 3) text from a web page, 4) a file or document (including images and audio) from a hard disk or networked storage, 5) a file or document from the world wide web (including images and audio) or 6) an existing multimedia message. Then in step 1206, the user indicates a destination for the captured data. This is preferably done by the user using a mouse-type control device to select a multimedia object and drag and drop that object into a message window. The process of dragging and dropping preferably includes providing feedback to the user during the process such that the user knows that the process for automatically capturing an image of an existing message or object is being performed. Those skilled in the art will understand that this can be done in a variety of different ways. Most computer users are familiar with the drag and drop operations popularized by the Macintosh and Windows operating systems. Based on the input from the user from step 1204 and 1206, the method of the present invention determines 1208 the data that must be captured In other words, the position of the mouse when the button was clicked is determined, and the window or image that was being displayed is determined. Also, the user selection of either a single image (object) or an icon representing a whole web page is also determined. It should be noted that in either instance, the reference stored by the system is to the source web page, and not the particular object selected if it is a component of a web page.

There are a variety of possible ways to determine which content is being dropped into a multimedia message. The following description is meant to be an example and not an exhaustive description of the process. Many other ways of implementing the drag and drop operation will be known and easily implemented by those skilled in the art.

On a Microsoft Windows platform running Internet Explorer, a drag operation from an Explorer Window is initiated when the user clicks on one of: 1) the icon next to the URL in the address window, 2) an image in the web page, or 3) highlighted text within the page itself. The user then drags the selected item into the message window of the multimedia message application. When the user releases the mouse button in the message window, the multimedia application (MMA) is informed of the contents of the dragged objects by the operating system drag and drop interface that is implemented differently depending on whether JAVA, Visual Basic, or some other programming language is used. Dropping an object into JAVA, for instance, means that the JAVA application listening for a drop operation receives an object that represents a JAVA String and contains some textual description of the dropped object. In the case of a file from the file storage of the computer, the string is the complete path and filename of the file object. In the case of an image from a web page, it is also a complete path and filename, but the file comes from a special temporary directory that indicates it was downloaded from the Internet. In the case of dragging a URL from the Internet Explorer window, the String object represents a full URL, starting with "http://". This makes it easy to distinguish between an image and a full URL dragged from the Explorer window.

If a full URL is received by the MMA, it takes a snapshot of the portion of the screen containing the Internet Explorer browser in order to make a visual representation of the link and display that in the MMA's message window. Scaling down the high-resolution image captured from the screen can also generate a lower-resolution thumbnail.

If an image is dragged in from the web browser to the MMA, that image is used as the representation of the link and the URL of the link is requested from the Internet Explorer browser using methods widely understood by software developers. Thus, both the representational image and the link are captured and stored as part of the object 900.

If an image is dragged from the file storage of the computer or another networked computer, the image is stored in the multimedia message system 804 and is thereby made available to message recipients. This is accomplished using either a network file copy over NFS, using FTP, HTTP or some other well-known network file transfer protocol. The image is assigned a unique ID number and the URL of the newly transferred image becomes the link or pointer to the dropped image. In addition, the image itself becomes the image representing the file and a low-resolution version of the image can be created as a thumbnail for the high-resolution image.

Other documents stored on a local file system and dropped into the MMA can be automatically added to the multimedia message system 804 and the link or URL would be based on the new unique filename generated by the multimedia message system 804 for that file. If it is possible to extract or construct an image that represents that file, such an extracted or constructed image could represent the file in the object 900. However, if an image cannot be made or obtained to represent that file, a generic pictorial representation of document type, commonly referred to as an 'icon', could be chosen and associated with the object 900. In the case that the file type is unrecognizable, a sufficiently generic icon could be selected to represent the file. All objects dragged into the multimedia message system 804 application window can have images that represent them— either very specific images that replicate the content of the object, more generic icon images that represent simply the type of content that is contained in the file, or in the final case, an image that indicates the content is unknown.

If selected text is dragged into an MMA window, the string object delivered to the application contains the selected text. In this case, either the text can be converted into a visual representation like a label and that label can be used in the multimedia message, or a text icon can be the image for the object 900.

Multimedia messages stored in the multimedia message system 804 already have images associated with them. If the object dragged into an MMA window is another multimedia message, the representative image is used in the created object 900. The link is a pointer or URL to the MMS which indicates which message is being referenced.

There are many cases where information is made available on the web only after the user has entered an appropriate username and password. Web documents are often modified, sometimes daily, which means that a URL may not actually contain the same information at a later point in time. For this reason, it is advantageous to store information contained on a web page at the time the URL is dropped into the MMA. The web page is downloaded and stored in a file that is associated with the object 900—for example in other information 908. This information can be used to present the original information contained in the web page to the recipient of the message even if the web page has been modified in the time between when the message was sent and it was received.

At step 1214, an image is captured from the screen to associate with a URL that has been dropped into the MMA window. There are many ways of generating a representational image of which capturing the screen is perhaps the most convenient. An image can be generated inside a memory buffer that is not displayed on the screen as well. In the case of an audio file, a waveform of the audio object could be rendered and used as the image for the audio object. Alternatively, the thumbnail could have been generated previously and retrieved.

Next in step 1210, the information in the window or object is captured. For example, the multimedia message or web page in a window is retrieved. Then in step 1212, a reference or link to the information displayed in the window is stored in the object. For example, if the information is a web page, then a hypertext link to the page may be stored. If the information is a message in the multimedia message system 804, then a reference to that message may be stored. Other links to other forms of information such as intranet web pages or other content may similarly be stored. In an alternate embodiment, the system 804 may capture the data and store it as part of the multimedia message system. For a web page, the HTML code used to produce the page can be stored. This is particularly advantageous to ensure that the data is preserved for later use. This is a particular issue as the content on pages present on the World Wide Web can change and destroy the value and meaning of links and references to a given page. Next in step 1214, an image of the information captured in step 1210 is generated. This is preferably performed by generating a screen shot of the information being displayed in the window. Alternatively, the data captured may be rendered and processed by other means. For example, the image data may be scaled; the waveform of an audio object may be compacted, or the thumbnail may have been generated previously and need only be retrieved. Then in step 1216, an object or an instance of an object as described with reference to FIG. 9 above is created, and the image generated in step 1214 is stored in the appropriate field, and the link used in step 1210 to capture the information is stored in the newly created object. The object is then added 1218 to the message or conversation being created in the composition window into which the user dropped the information. Those skilled in the art will recognize that there is a variety of permutations to this general method only a few of which will be described in more detail with reference to FIGS. 13 and 14.

Figure 13:
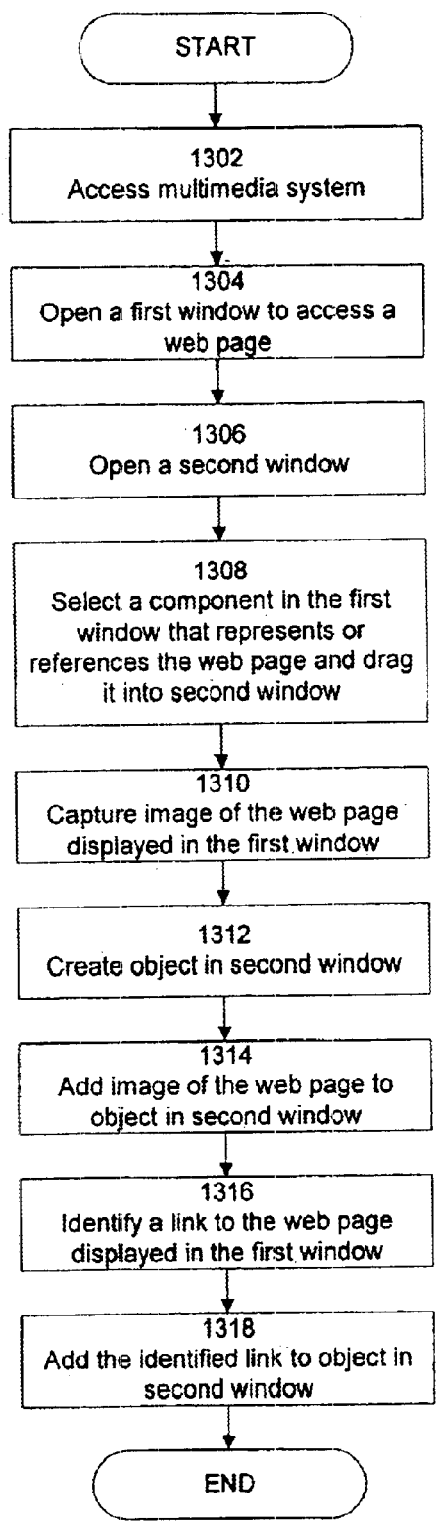
FIG. 13 is a flow chart of a preferred method for automatically creating an object including an image of a web page according to the present invention.

Referring now to FIG. 13, the preferred method for automatically creating an object including an image of a web page in the multimedia message system of the present invention is more particularly described. For convenience and ease of understanding, certain of the steps of FIG. 13 have the same functionality as described above with reference to FIG. 12. The process begins in the same manner as the general with a user accessing 1302 the multimedia message system 804. Once operating in the multimedia message system 804 environment, the user opens 1304 an application such as the web browser 806 and uses it to access a web page on the World Wide Web. A particular web page is retrieved and displayed in a window 1104 of the browser 806. Next, the user opens 1306 a second, composition window 1106 provided by the multimedia message system 804. Then using the mouse-type controller, the user indicates 1308 the selection of the first window by dragging an icon representing the URL (e.g., the Microsoft Internet Explorer icon) and dropping it into the second window. The system 804 then captures an image of the web page displayed in the first window. This is preferably done by the image generation module 814 under control of the automatic object creation module 810. The image may be captured by generating a screen shot of the web page as displayed in the first window. In an alternate embodiment, the HTML may be rendered off-line to generate an image of the web page. Then in step 1312, an object is created in the second window, and added to the message or conversation being composed in the second window. The creation of an object provides a mechanism for storing and adding content to a message. Then in step 1314, the image of the web page is stored in the object in the field provided. The link used to provide the web page in the first window is then determined and identified in step 1316. Finally, this link is then stored 1318 in the field provided in the object. While this more particular method has been described above in the context of opening a new composition window, and adding the object to the newly created message, those skilled in the art will recognize that the automatic generation method of the present invention is applicable to the modification of existing messages, the forwarding of messages or the reply to messages. In any instance when the user would like to add content to an existing or new message, the automatic generation methods are applicable.

Figure 14:
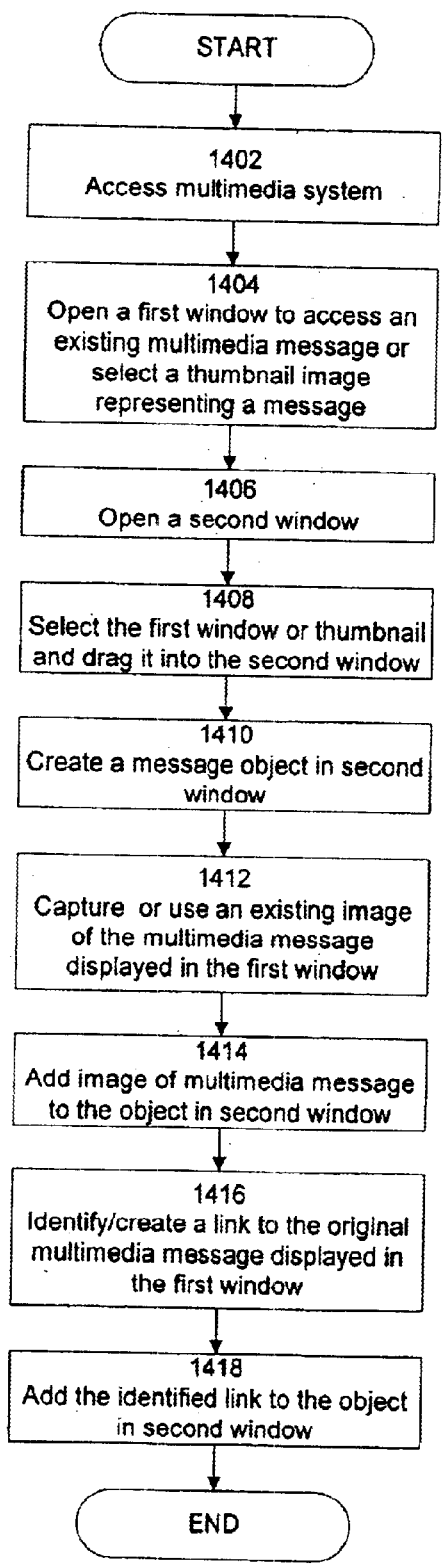
FIG. 14 is a flow chart of a preferred method for automatically creating an object including an image of an existing multimedia message according to the present invention.

Referring now to FIG. 14, the preferred method for automatically creating an object including an image of an existing multimedia message in the multimedia message system 804 is more particularly described. Again, the process begins in the same manner as the general method with a user accessing 1402 the multimedia message system 804. Once operating in the multimedia message system 804, the user opens 1404 a window and retrieves a particular existing multimedia message. The particular multimedia message is retrieved and displayed in a window 1102. Next, the user opens 1406 a second, composition window 1106 provided by the multimedia message system 804. Then using the mouse-type controller, the user inputs 1408 the selection of the first window by dragging it and dropping it into the second window. Then in step 1410, an object is created in the second window, and added to the message or conversation being composed in the second window. This object is preferably an embedded message object that is added (nested) into a new message, but may also be added as part of an existing message. Then in step 1412, an image of the multimedia message shown in the first window is captured. Again, this may be done by generating a screen shot of what is being displayed in the first window or using an existing visual representation of what is being displayed in the first window. Such an existing visual representation of what is being displayed in the first window may be generated in advance of selection by the user automatically by the system. The image is added 1414 to the object in the field provided. Then the method determines 1416 a reference or link to the multimedia message being displayed in the first window. The link can be later used to update the image, or retrieve the original multimedia message. Finally, this link is then stored 1418 in the field provided in the object to complete the automatic image generation process.

Figure 15:
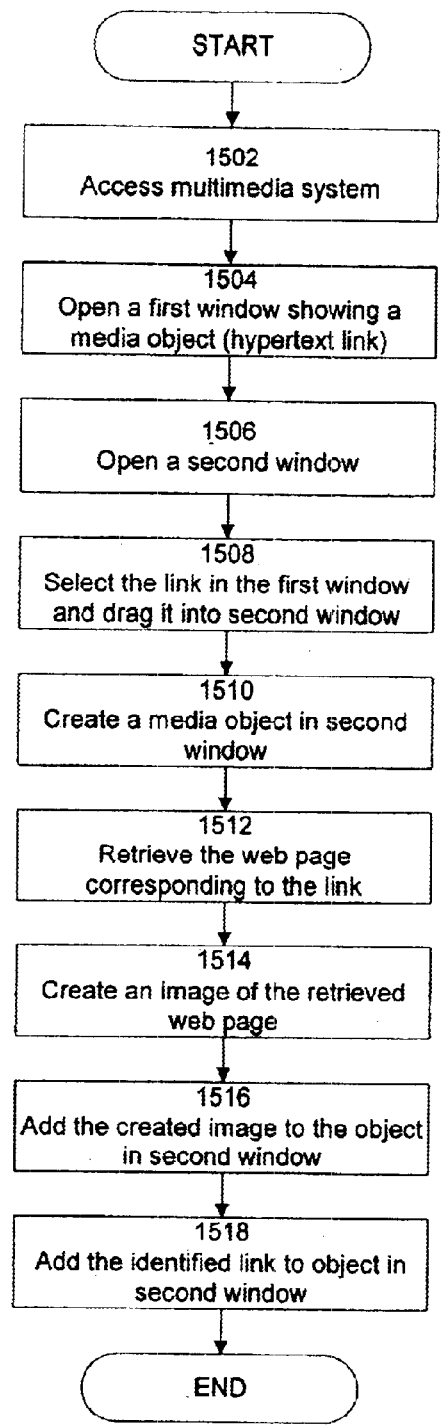
FIG. 15 is a flow chart of a preferred method for automatically creating an object including an image from a hypertext link according to the present invention.

Referring now to FIG. 15, a third and final embodiment of the general method will be described. FIG. 15 shows a preferred method for automatically creating an object including an image from a hypertext link according to the present invention. Again, the process begins in the same manner as the general method with a user accessing 1502 the multimedia message system 804. Once operating in the multimedia message system 804, the user opens 1504 a window and retrieves a particular existing multimedia message or web page. The window may be in any application and need only be able to display a media object such as a hypertext link and identify the text as such. The particular content or multimedia message is retrieved and displayed in a window 1102. Next, the user opens 1506 a second, composition window 1106 provided by the multimedia message system 804. Then using the mouse-type controller, the user selects 1508 the media object such as by selection of a hypertext link shown in the first window by dragging it and dropping the link into the second window. Then in step 1510, an object is created in the second window, and added to the message or conversation being composed in the second window. Again, this object may be added (nested) into a new message or be added as part of an existing message. Then in step 1512, the web page corresponding to the hypertext link is retrieved, although not necessarily displayed. Then in step 1514, an image of the retrieved web page is captured. The web page may optionally be displayed to the user if desired. The image generation is preferably done by generating a screen shot of the retrieved web page. The image is added 1516 to the object in the field provided. Finally, the method stores 1518 the link dragged into the second window to in the appropriate field of the object to complete the automatic image generation process.

Figure 16:
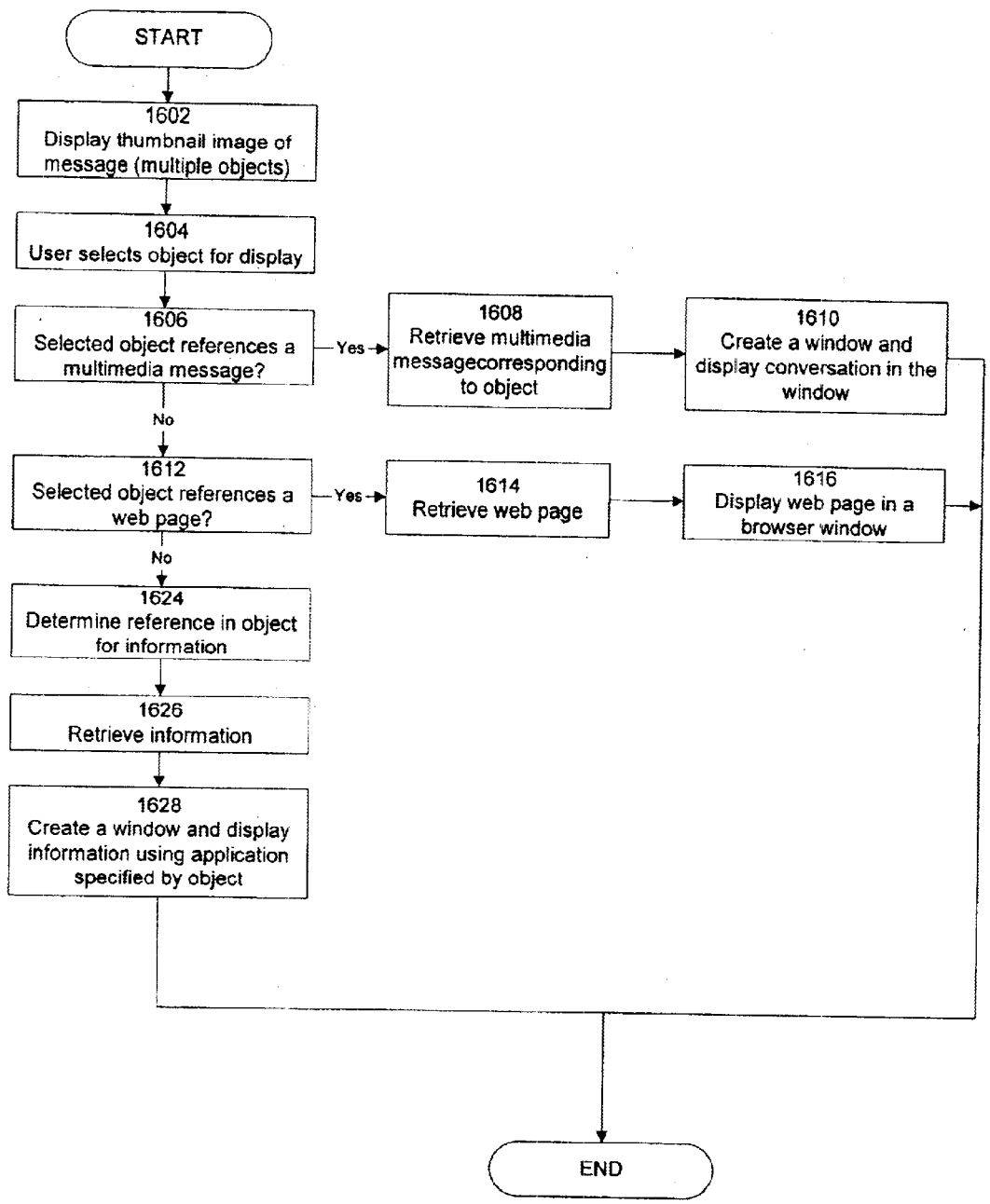
FIG. 16 is a flow chart of a preferred method for viewing information for an object according to the present invention.

Viewing Original Content Represented by Thumbnail Images. Referring now to FIG. 16, the preferred method for viewing information for an object according to the present invention will be described. While this is a separate method from the thumbnail generation, those skilled in the art will recognize that certain synergies result when the novel display and nesting mechanism is used in conjunction with the automatic thumbnail generation described above.

The process begins by displaying 1602 a thumbnail image of a message or message object by the multimedia message system. Such a thumbnail image may merely be part of a larger message having a plurality of elements or may be displayed alone. Next, the user selects 1604 an object for display of its original content. This is preferably done with the user positioning the pointer over the thumbnail image and clicking the mouse. Once the object has been selected, the method preferably performs a series of tests 1606, 1612, 1618 to determine the type of underlying content that has been encapsulated in the object, and the manner of display best suited for the content.

In step 1606, the method first tests whether the object references a multimedia message. If so, the method retrieves 1608 the message referenced or linked to the object. Then a window of the multimedia message system is opened or created, and the retrieved multimedia object is displayed 1610 in the window. The user may then further review the original message, send responses or access other objects shown in the original message. It should be noted that the multimedia message may include a reference to another multimedia message (nested message).

If the object does not reference a multimedia message in step 1606, the method continues in step 1612. In step 1612, the method first tests whether the object references a web page. If so, the method retrieves 1614 the web page referenced or linked to the object. Then a window of the web browser is opened, and the retrieved web page is displayed 1616 in the window. Alternatively, a cached version of the web page and a screen shot could be shown instead of the retrieved web page. The user may then use the full functionality of the web browser to go to other links and retrieve other pages.

If the object does not reference a web page in step 1612, the method continues in step 1624, and the method assumes that the object references original content such as a document, sound clip or video clip. Then the method determines the reference to the original content file in step 1624. Then in step 1626, the method retrieves the information corresponding to the reference from step 1624. Finally in step 1628, the method opens or creates a window suitable for the retrieved information and displays the information using the application designated for the object media type. For example, the information could be a document, spreadsheet, or sound clip, and the appropriate application is launched so that the information can be viewed, modified, or transmitted.

Figure 17:
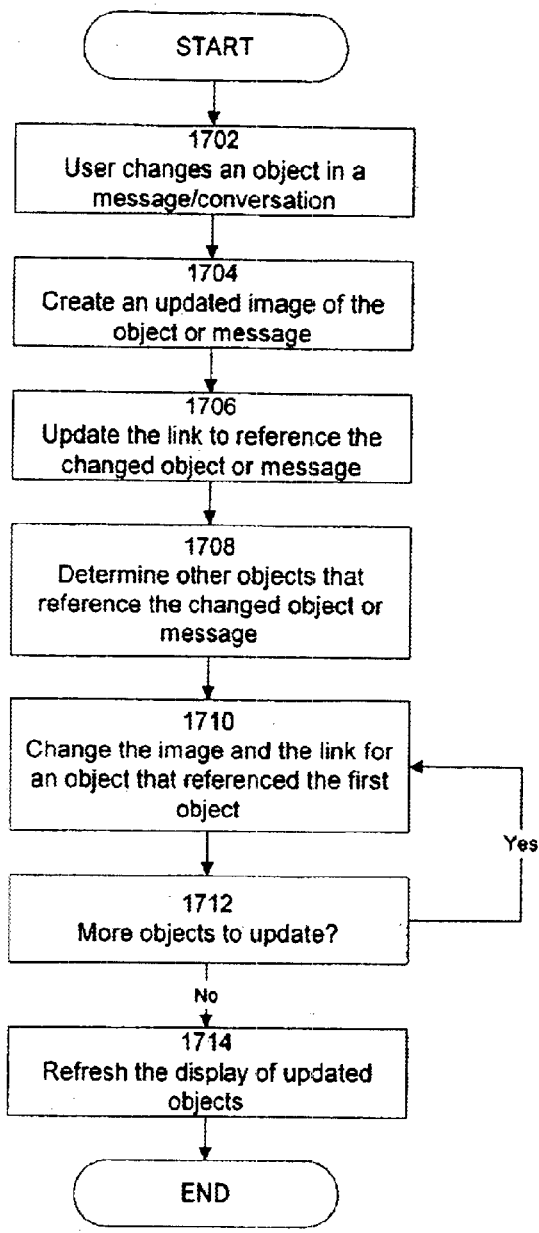
FIG. 17 is a flow chart of a preferred method for automatically updating images of an object after a change to an existing multimedia message.

Referring now to FIG. 17, a method for automatically updating images of an object after a change to an existing multimedia message will be described. The present invention is particularly advantageous because it provides images for each element that visually convey the real content underlying the thumbnail or icon. The process begins in step 1702 with the user modifying some object that is a portion of an existing message for which a thumbnail image has been generated. For example, reference to a document may be deleted or added, or a new object could be added to the message. Then the method creates an updated thumbnail image of the modified message in step 1704. This is done using any portion of the methods just described above. Next in step 1706, the method updates the link to reference the changed object or message. In some cases this step may be unnecessary because the link or reference remains the same even though the object or web page has changed. Then in step 1708, the method determines all the objects in the multimedia messaging system that reference the original message. In the system, each message is stored by an authorized server. Changes to the messages are reflected (pushed) to this server and the server in turn notifies any clients that have registered interest in the message of a change to the message. When any client is displaying the message, the system checks with the server to ensure that version of the message that is going to be displayed is the latest or current version that is being maintained by the authorized server. In one embodiment, the user may select where automatic updating should occur either in a user profile or on an object-by-object basis. Then in step 1710, the method selects one object that references the changed object and updates or changes the image and the link stored in the selected object. Then the method tests 1712 whether there are more objects to update. If so, the method selects a next object and returns to step 1710. If not the method continues and updates 1714, the display of any object that has been updated so it is displayed with the most current thumbnail image of the object. After updating the images, the method is complete and ends.

While the present invention has been described with reference to certain preferred embodiments, those skilled in the art will recognize that various modifications may be provided. For example, the drag and drop functionality provided by the present invention may be used to augment the capabilities already existing in a multimedia message system. In particular, if a user is recording a voice message, and at the same time drags and drops one window into the composition window for the voice message, the system could automatically capture the image as described above and create a new visual object as well as also provide an index to a particular point in the voice message that relates to the captured image. This could all be done automatically at the same time the user is creating the voice message. Variations upon and modifications to the preferred embodiments are provided for by the present invention, which is limited only by the following claims.

What is claimed is:

1. A method for automatic creation of a visual representation of a message, the method comprising:
   determining a first media object to be captured, the first media object being displayed using a first software application;
   capturing information about the first media object;
   generating a first visual representation of the first captured information;
   determining a second media object to be captured, the second media object being displayed using a second software application, the second software application being distinct from the first software application;
   capturing information about the second media object;
   generating a second visual representation of the second captured information; and
   creating a message object including the first generated visual representation and the second generated visual representation.

2. The method of claim 1, further comprising creating a reference to the first captured information; and wherein the message object further includes the reference to the first captured information.

3. The method of claim 2, wherein creating a reference to the first captured information comprises generating a hypertext link to a page if the information is a web page, or generating a reference to a location in a multimedia message system if the information is a message.

4. The method of claim 2 wherein the reference to the first captured information points to a location other than the beginning of the first captured information.

5. The method of claim 1, wherein determining the first media object to be captured further comprises:
   indicating data to be captured; and
   indicating a destination for the captured data.

6. The method of claim 5, wherein indicating data to be captured includes selecting a window that contains a web page, an intranet page, a message thumbnail or window, a component of a web page, a messages or an object.

7. The method of claim 5, wherein the data is 1) a web page, 2) an image from a web page, 3) text from a web page, 4) a file or document (including images and audio) from a hard disk or networked storage, 5) a file or document from the world wide web (including images and audio) or 6) an existing multimedia message.

8. The method of claim 5, wherein indicating data and indicating a destination are performed using a mouse-type control device to select a window and drag and drop that window into another window.

9. The method of claim 5, wherein indicating a destination for the captured data includes selecting a destination message, and the method further comprises adding the created message to the destination message.

10. The method of claim 1, wherein generating a visual representation of the first captured information includes:
    determining a portion of data for a display for capture;
    extracting from a display buffer memory that portion of data dedicated to displaying the determined portion; and
    using the extracted data as the visual representation.

11. The method of claim 1 wherein the first visual representation is determined by the first captured information.

12. The method of claim 1 wherein the first media object is a message.

13. A method for automatically generating references to objects, the method comprising:
    determining a first media object to be captured, the first media object being displayed using a first software application;
    capturing information about the first media object;
    creating a first reference to the first captured information;
    determining a second media object to be captured, the second media object being displayed using a second software application, the second software application being distinct from the first software application;
    capturing information about the second media object;
    creating a second reference to the second captured information; and
    creating a message object including the first created reference and the second created reference.

14. The method of claim 13, wherein the step of determining the first media object to be captured further comprises:
   indicating data to be captured; and
   indicating a destination for the captured data.

15. The method of claim 14, wherein indicating data to be captured includes selecting a window that contains a web page, an intranet page, a message thumbnail or window, a component of a web page, a message or an object.

16. The method of claim 14, wherein the data is 1) a web page, 2) an image from a web page, 3) text from a web page, 4) a file or document (including images and audio) from a hard disk or networked storage, 5) a file or document from the world wide web (including images and audio) or 6) an existing multimedia message.

17. The method of claim 13, wherein creating a reference to the first captured information comprises generating a hypertext link to a page if the information is a web page, or generating a reference to a message in a message system if the information is a message.

18. The method of claim 13, wherein creating a reference to the first captured information comprises generating a reference to an object in an information system if the information is a previously captured object.

19. The method of claim 13 wherein the reference to the first captured information points to a location other than the beginning of the first captured information.

* * * * *

UNITED STATES PATENT AND TRADEMARK OFFICE
CERTIFICATE OF CORRECTION

PATENT NO.    : 6,693,652 B1                                             Page 1 of 1
DATED         : February 17, 2004
INVENTOR(S)   : John W. Barrus and Gregory J. Wolff It is certified that error appears in the above-identified patent and that said Letters Patent is hereby corrected as shown below:

Column 28,
Line 21, please change "messages" to -- message --

Column 29,
Line 1, please delete "the step of"

Signed and Sealed this

Twenty-second Day of June, 2004

JON W. DUDAS
*Acting Director of the United States Patent and Trademark Office*